United States Patent
Hayashi

(10) Patent No.: US 10,389,901 B2
(45) Date of Patent: Aug. 20, 2019

(54) INFORMATION PROCESSING DEVICE, INFORMATION PROCESSING SYSTEM, AND INFORMATION PROCESSING METHOD

(71) Applicant: Yasuhiro Hayashi, Kanagawa (JP)

(72) Inventor: Yasuhiro Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/142,323

(22) Filed: Sep. 26, 2018

(65) Prior Publication Data

US 2019/0098161 A1 Mar. 28, 2019

(30) Foreign Application Priority Data

Sep. 28, 2017 (JP) .................. 2017-189192
Jul. 23, 2018 (JP) .................. 2018-138043

(51) Int. Cl.
*H04N 1/00* (2006.01)

(52) U.S. Cl.
CPC ..... *H04N 1/00941* (2013.01); *H04N 1/00925* (2013.01); *H04N 2201/0094* (2013.01)

(58) Field of Classification Search
USPC ...................................... 358/1.15
See application file for complete search history.

(56) References Cited

U.S. PATENT DOCUMENTS 6,529,909 B1* 3/2003 Bowman-Amuah ........................ G06F 17/30569
7,756,944 B2* 7/2010 Ikenoya .................. G06F 21/31 709/217

FOREIGN PATENT DOCUMENTS

JP 2013-152743 8/2013

* cited by examiner

*Primary Examiner* — Henok Shiferaw
*Assistant Examiner* — Darryl V Dottin
(74) *Attorney, Agent, or Firm* — Harness, Dickey & Pierce, P.L.C.

(57) ABSTRACT

An information processing device installed with a program, connectable with an apparatus, includes circuitry configured to restrict an operation of specific information, initiated by the program, based on an access level defined for the specific information, transmit a first request, initiated by the program, to the apparatus connected with the information processing device, acquire given information including the specific information from the apparatus as a response to the first request, and transmit a second request, initiated by the program, to the apparatus based on the acquired given information including the specific information to request the apparatus to perform specific processing in response to the second request received from the information processing device.

16 Claims, 21 Drawing Sheets

FIG. 6

APPARATUS INFORMATION INSTANCE 200

| FIELD NAME | FIELD VALUE | READING RANGE | REWRITING RANGE |
|---|---|---|---|
| IP ADDRESS | 192.168.10.100 | WHOLE RANGE | WITHIN LIBRARY |
| MODEL NAME | modelA | WHOLE RANGE | WITHIN LIBRARY |
| SUPPORT PDL | PDL1, PDL2 | WITHIN LIBRARY | WITHIN LIBRARY |
| NETWORK INFORMATION | SSID:network1 ENCRYPTION METHOD: WPA Password:12345678 | WITHIN LIBRARY | WITHIN LIBRARY |

FIG. 7

PRINT SETTING INFORMATION INSTANCE 300

| FIELD NAME | FIELD VALUE | READING RANGE | REWRITING RANGE |
|---|---|---|---|
| NUMBER OF COPIES | 3 | WHOLE RANGE | WHOLE RANGE |
| PRINT PAGE RANGE | 1 | WHOLE RANGE | WHOLE RANGE |
| PRINT COLOR | COLOR | WHOLE RANGE | WHOLE RANGE |

FIG. 9

APPARATUS INFORMATION CLASS
⌐1100

```
package printlibrary; ~1101

/** apparatus information class */
public class MfpInfo ~1102
{
    public IPAddress getIPAddress() { ... }        ~1103
    void setIPAddress(IPAddress ip) { ... }        ~1104
    public String getModelName() { ... }           ~1105
    void setModelName(String name) { ... }         ~1106
    String getSupportPDL() { ... }                 ~1107
    void setSupportPDL(String pdl) { ... }         ~1108
    NetworkInfo getNetworkInfo() { ... }           ~1109
    void setNetworkInfo(NetworkInfo nw) { ... }    ~1110
}
```

FIG. 10

PRINT SETTING INFORMATION CLASS
⌐1200

```
package printlibrary; ~1201

/** print setting information class */
public class PrintSetting ~1202
{
    public int getCopies() { ... }                 ~1203
    public void setCopies(int n) { ... }           ~1204
    public String getPrintPage() { ... }           ~1205
    public void setPrintPage(String p) { ... }     ~1206
    public String getColor() { ... }               ~1207
    public void setColor(String c) { ... }         ~1208
}
```

FIG. 11
APPARATUS INFORMATION ACQUISITION CLASS

```
package printlibrary;  ~1301

/** apparatus information acquisition class */
public class MfpInfoReader  ~1302
{
    public MFPInfo getMfpInfo() { ... }
}
```
~1300
~1303

FIG. 12
PRINT PROCESSING CLASS

```
package printlibrary;  ~1401

/** print processing class */
public class Mfp  ~1402
{
    public boolean print(MfpInfo info, PrintData data, PrintSetting setting) { ... }
}
```
~1400
~1403

FIG. 13

```
package printapp;  ~1501

/** print application class */
public class PrintApp  ~1502
{
        /** print execution class */
        public void print()  ~1503
        {
                /** acquire apparatus information */
                MfpInfoReader reader = new MfpInfoReader();
                MfpInfo info = reader.getMfpInfo();                  } ~1504

/** set print setting information */
                PrintSetting setting = new PrintSetting();
                setting.setCopies(3);
                setting.setColor("Color");                           } ~1505
                setting.setPrintPage("1");

/** set print target data */
                PrintData data = ...;  ~1506

/** request execution of printing */
                Mfp mfp = new Mfp();
                mfp.print(info, data, setting);                      } ~1507
        }
}
```

~1500

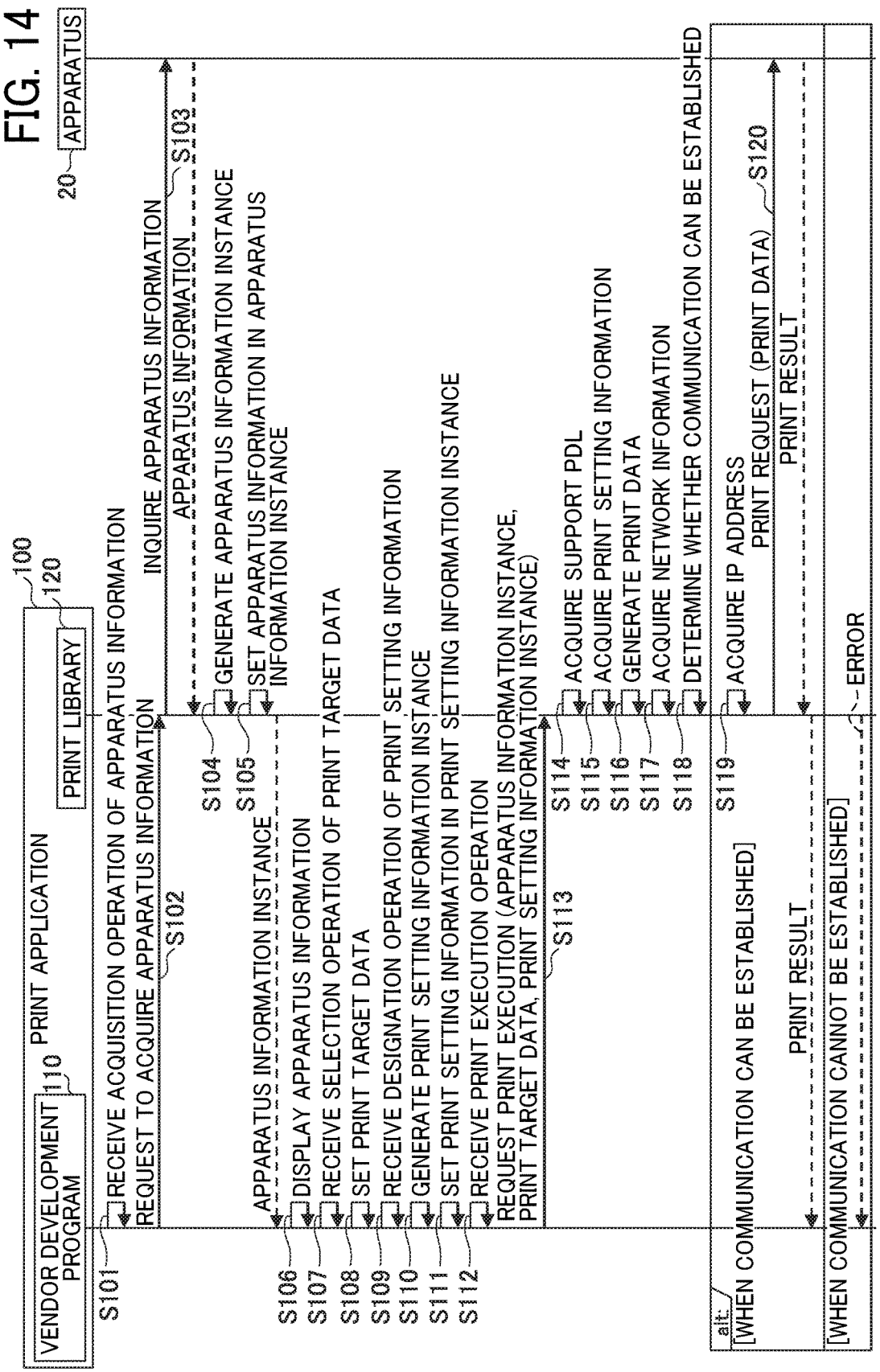

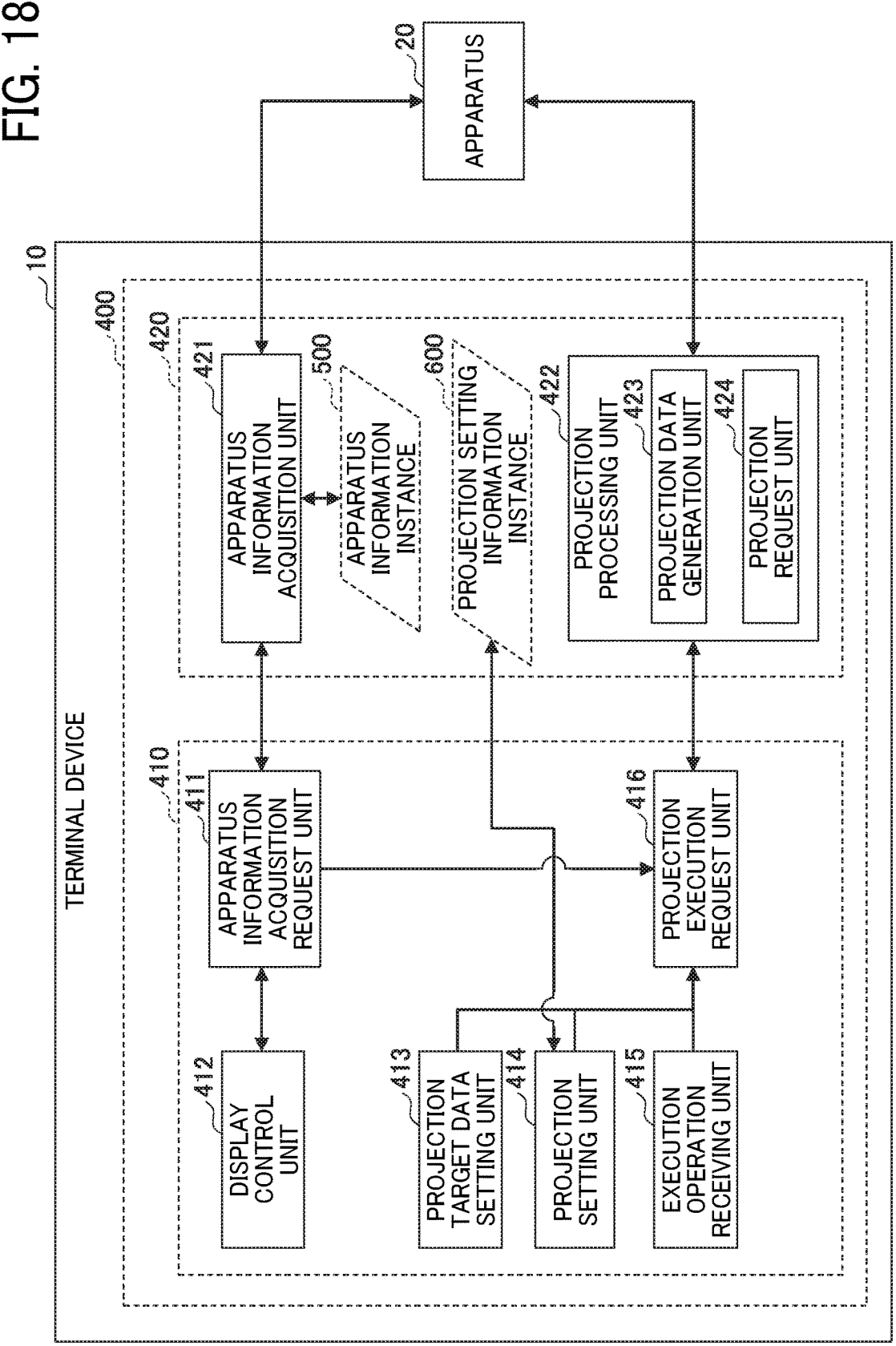

FIG. 19

APPARATUS INFORMATION INSTANCE 500

| FIELD NAME | FIELD VALUE | READING RANGE | REWRITING RANGE |
|---|---|---|---|
| IP ADDRESS | 192.168.10.110 | WHOLE RANGE | WITHIN LIBRARY |
| MODEL NAME | modelB | WHOLE RANGE | WITHIN LIBRARY |
| RESOLUTION | 1280 × 720 | WITHIN LIBRARY | WITHIN LIBRARY |
| NETWORK INFORMATION | SSID:network1 ENCRYPTION METHOD: WPA Password:12345678 | WITHIN LIBRARY | WITHIN LIBRARY |

FIG. 20

PROJECTION SETTING INFORMATION INSTANCE 600

| FIELD NAME | FIELD VALUE | READING RANGE | REWRITING RANGE |
|---|---|---|---|
| SWITCHING METHOD | fade | WHOLE RANGE | WHOLE RANGE |

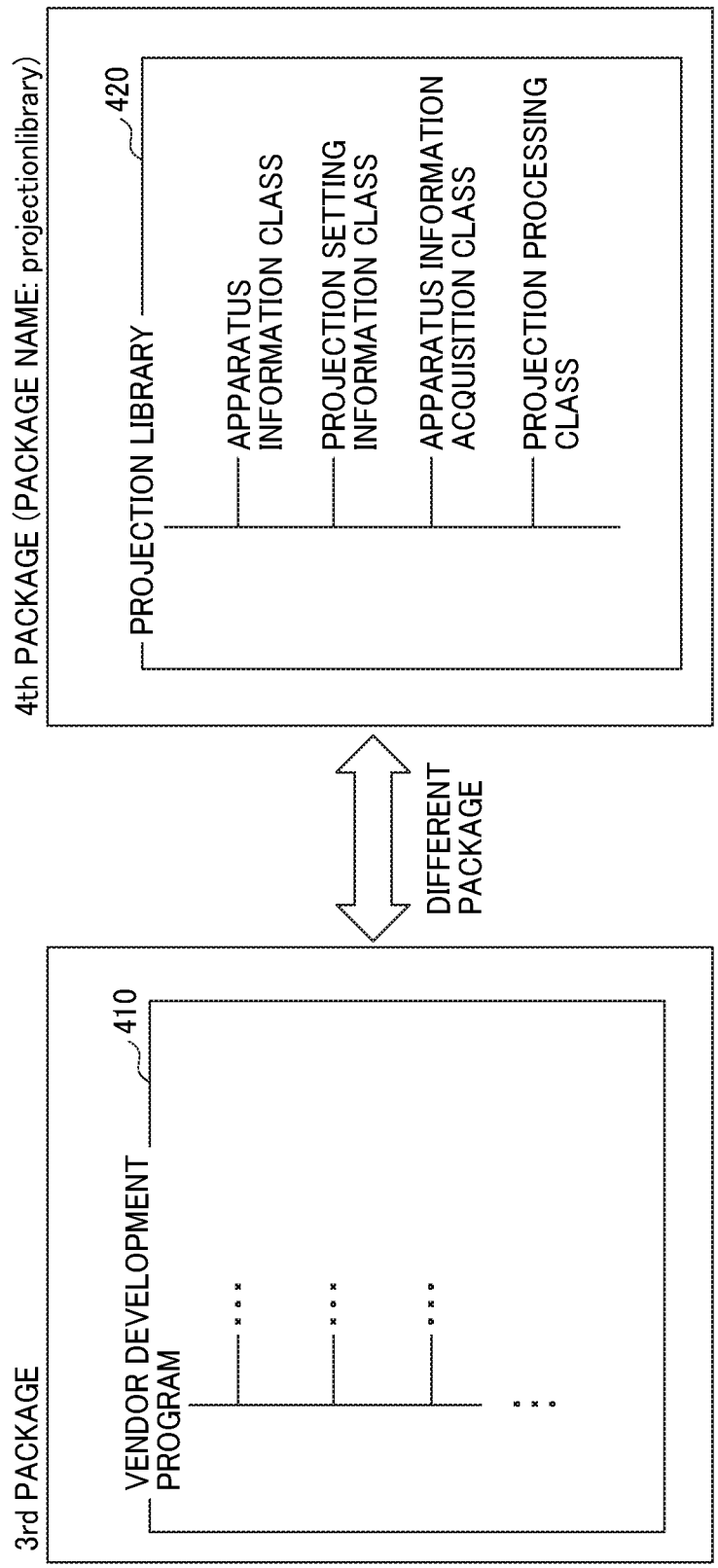

FIG. 22

APPARATUS INFORMATION CLASS 2100

```
package projectionlibrary; ~2101

/** apparatus information class */
public class ProjectorInfo ~2102
{
    public IPAddress getIPAddress() { ... }          2103
    void setIPAddress(IPAddress ip) { ... }          2104
    public String getResolution(){ ... }             2105
    void setModelName(String name) { ... }           2106
    String getResolution() { ... }                   2107
    void setResolution(String res) { ... }           2108
    NetworkInfo getNetworkInfo() { ... }             2109
    void setNetworkInfo(NetworkInfo nw) { ... }      2110
}
```

FIG. 23

PROJECTION SETTING INFORMATION CLASS 2200

```
package projectionlibrary; ~2201

/** projection setting information class */
public class ProjectSetting ~2202
{
    public int getSwitch() { ... }              2203
    public void setSwitch(String s) { ... }     2204
}
```

FIG. 24

APPARATUS INFORMATION ACQUISITION CLASS ~2300

```
package projectionlibrary; ~2301

/** apparatus information acquisition class */
public class ProjectorInfoReader ~2302
{
    public ProjectorInfo getProjectorInfo(){ ... }
}
```
~2303

FIG. 25

PROJECTION PROCESSING CLASS ~2400

```
package projectionlibrary; ~2401

/** projection processing class */
public class Projector ~2402
{
    public boolean project(ProjectorInfo info, ProjectData data, ProjectSetting setting) { ... }
}
```
~2403

FIG. 26

```
package projectionapp; ~2501

/** projection application class */
public class projectionApp ~2502
{
    /** projection execution class */
    public void project() ~2503
    {
        /** acquire apparatus information */
        ProjectorInfoReader reader = new ProjectorInfoReader();  ⎫
        ProjectorInfo info = reader.getProjectorInfo();          ⎬ ~2504

/** set projection setting information */
        ProjectSetting setting = new ProjectSetting();  ⎫
        setting.setSwitch("fade");                      ⎬ ~2505

/** set projection target data */
        ProjectData data = ...;  ~2506

/** request execution of projection */
        Projector prj = new Projector();           ⎫
        prj.project(info, data, setting);          ⎬ ~2507
    }
}
```

~2500

INFORMATION PROCESSING DEVICE, INFORMATION PROCESSING SYSTEM, AND INFORMATION PROCESSING METHOD

CROSS-REFERENCE TO RELATED APPLICATION

This application claims priority pursuant to 35 U.S.C. § 119(a) to Japanese Patent Application Nos. 2017-189192, filed on Sep. 28, 2017, and 2018-138043, filed on Jul. 23, 2018 in the Japan Patent Office, the disclosure of which is incorporated by reference herein in its entirety.

BACKGROUND

Technical Field

This disclosure relates to an information processing device, an information processing system, and an information processing method.

Background Art

Manufacturers of apparatuses, such as multifunctional peripherals (MFPs), provide libraries to external vendors for operating the apparatuses, such as acquiring various information from the apparatuses and requesting the apparatuses to perform various processing. By utilizing the libraries provided by manufacturers, the external vendors can create vendor-unique applications that perform processing linked to the apparatuses without directly installing and implementing processing such as acquiring various information from the apparatuses or requesting the apparatuses to perform various processing.

Further, some image forming apparatuses can extend a function of a framework, which provides a part of interfaces such as application programming interface (API) as publicly open information while securing a given security level of the image forming apparatuses appropriately.

By utilizing the libraries provided by manufacturers of the apparatuses, for example, applications created by the external vendors can acquire apparatus information, such as internet protocol (IP) address of the apparatuses and data format supported by the apparatuses.

However, the applications created by the external vendors may overwrite the apparatus information acquired from the apparatuses. If the apparatus information is overwritten and inconsistency occurs in the apparatus information, the apparatuses may perform unintended actions.

SUMMARY

In one aspect of the present invention, an information processing device installed with a program corresponding to a first package, and connectable with an apparatus is devised. The information processing device includes circuitry configured to restrict an operation of specific information, initiated by the program, based on an access level defined for the specific information, transmit a first request, initiated by the program, to the apparatus connected with the information processing device, acquire given information including the specific information from the apparatus as a response to the first request, and transmit a second request, initiated by the program, to the apparatus based on the acquired given information including the specific information to request the apparatus to perform specific processing in response to the second request received from the information processing device.

In another aspect of the present invention, an information processing system is devised. The information processing system includes an image processing apparatus configured to perform image processing, and an information processing device installed with a program for providing a given function, connectable to the image processing apparatus. The information processing device includes circuitry configured to restrict an operation of specific information, initiated by the program, based on an access level defined for the specific information, transmit a first request, initiated by the program, to the image processing apparatus connected with the information processing device, acquire given information including the specific information from the image processing apparatus as a response to the first request, and transmit a second request, initiated by the program, to the image processing apparatus based on the acquired given information including the specific information to request the image processing apparatus to perform the image processing in response to the second request received from the information processing device.

In another aspect of the present invention, a method of processing information by an information processing device installed with a program providing a specific function, the information processing device connectable with an apparatus, is devised. The method includes restricting an operation of specific information, initiated by the program, based on an access level defined for the specific information, transmitting a first request, initiated by the program, to the apparatus connected with the information processing device, acquiring given information including the specific information from the apparatus as a response to the first request, and transmitting a second request, initiated by the program, to the apparatus based on the acquired given information including the specific information to request the apparatus to perform specific processing in response to the second request received from the information processing device.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6 illustrates an example of an apparatus information instance according to the first embodiment;

FIG. 7 illustrates an example of an example of a print setting information instance according to the first embodiment;

FIG. 9 illustrates an example of an apparatus information class according to the first embodiment;

FIG. 10 illustrates an example of a print setting information class according to the first embodiment;

FIG. 11 illustrates an example of an apparatus information acquisition class according to the first embodiment;

FIG. 12 illustrates an example of an example of a print processing class according to the first embodiment;

FIG. 13 illustrates an example of a program code of a vendor development program according to the first embodiment;

FIG. 14 is an example of a sequence diagram of a printing process according to the first embodiment;

FIG. 18 illustrates an example of a functional block diagram of a terminal device according to the second embodiment;

FIG. 19 illustrates an example of an apparatus information instance according to the second embodiment;

FIG. 20 illustrates an example of a projection setting information instance according to the second embodiment;

FIG. 21 illustrates an example of a relationship between a package of a vendor development program and a package of a projection library according to the second embodiment;

FIG. 22 illustrates an example of an apparatus information class according to the second embodiment;

FIG. 23 illustrates an example of a projection setting information class according to the second embodiment;

FIG. 24 illustrates an example of an apparatus information acquisition class according to the second embodiment;

FIG. 25 illustrates an example of a projection processing class according to the second embodiment;

FIG. 26 illustrates an example of a program code of a vendor development program according to the second embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, each of the embodiments of the present invention will be described in detail with reference to the drawings.

First Embodiment

Figure 1:
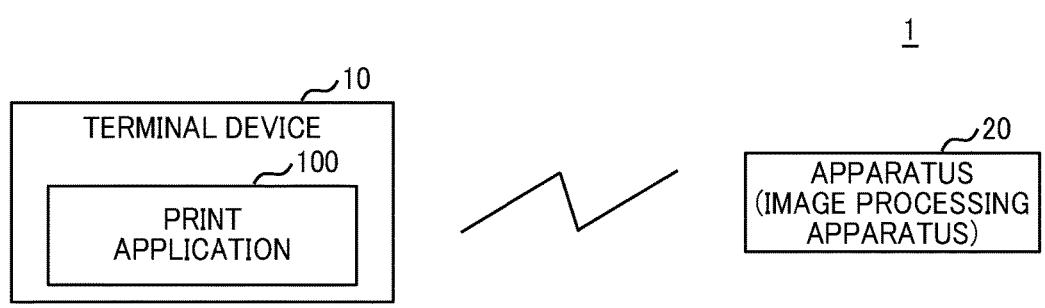
FIG. 1 illustrates an example of a schematic configuration of a printing system according to a first embodiment.

Configuration of System:

Hereinafter, a description is given of a schematic configuration of a printing system 1 according to a first embodiment with reference to FIG. 1. FIG. 1 illustrates an example of a schematic configuration of the printing system 1 according to the first embodiment.

As illustrated in FIG. 1, the printing system 1 includes, for example, one or more terminal devices 10, and one or more apparatuses 20. The terminal device 10 and the apparatus 20 can be communicably connected with each other using, for example, a short-range wireless communication, such as Bluetooth (registered trademark). Further, the terminal device 10 and the apparatus 20 can be communicably connected with each other, for example, via a wireless local area network (LAN), such as Wi-Fi (registered trademark).

The apparatus 20 is, for example, an image processing apparatus, such as a multifactional peripherals (MFP). The apparatus 20 performs various image processing, such as printing processing and scanning processing, in response to a request from the terminal device 10. In the first embodiment, the apparatus 20 is assumed as being an MFP. However, the apparatus 20 is not limited to MFP, but the apparatus 20 can be a copier, a printer, a scanner, a facsimile machine, a digital camera, a projector, an electronic conference terminal, an electronic whiteboard apparatus, an audio device, an in-vehicle device (e.g., car navigation system), an electrical home appliance (e.g., refrigerator), or the like.

The terminal device 10 is, for example, an information processing device, such as a smart phone. The terminal device 10 is developed by an external company (hereafter referred to as "third vendor"), which is different from the manufacturer of the apparatus 20. The terminal device 10 is installed with a print application 100 to perform processing associated or linked with the apparatus 20. With this configuration, a user of the terminal device 10 can perform printing using the apparatus 20 by using the print application 100.

The terminal device 10 is not limited to the smartphone, but the terminal device 10 can be, for example, a tablet terminal, a notebook personal computer (PC), a desktop PC, a game device, a digital camera, a wearable device, or the like.

Figure 2:
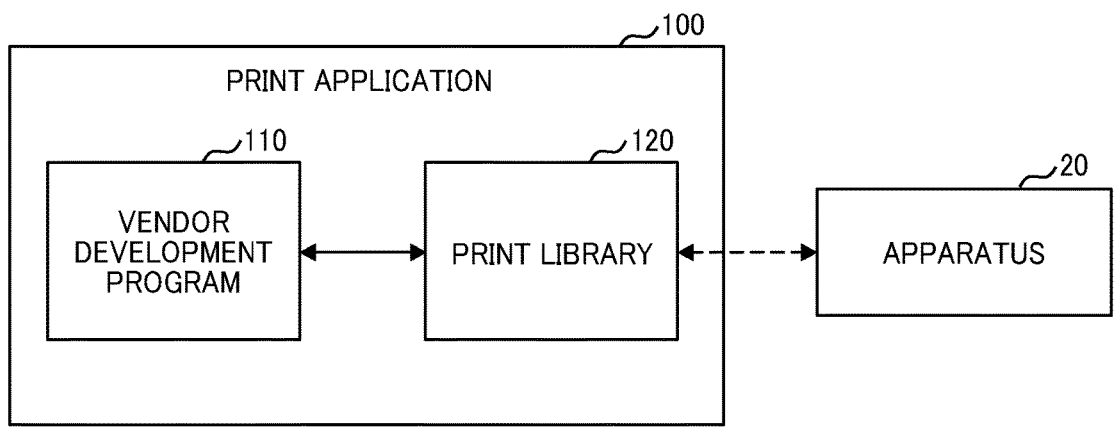
FIG. 2 illustrates an example of a configuration of a print application.

Configuration of Print Application:

Hereinafter, a description is given of a configuration of the print application 100 developed by the third vendor with reference to FIG. 2. FIG. 2 illustrates an example of a configuration of the print application 100.

As illustrated in FIG. 2, the print application 100 includes, for example, a vendor development program 110, and a print library 120. The vendor development program 110, developed by the third vendor, provides vendor-specific or unique functionality. The print library 120 is an application programming interface (API) group provided by a manufacturer of the apparatus 20.

The print library 120 is a program for providing a printing function. For example, the print library 120 defines an application programming interface (API) for acquiring apparatus information from the apparatus 20, and an API for requesting a printing operation to the apparatus 20. Therefore, by calling the API defined in the print library 120, the vendor development program 110 can perform various processing in cooperation with the apparatus 20, such as acquiring the apparatus information from the apparatus 20, and transmitting a request of printing operation to the apparatus 20.

In this configuration, the print library 120 is configured such that the vendor development program 110 cannot rewrite the apparatus information acquired, for example, from the apparatus 20. With this configuration, a situation that the apparatus information prepared in the form of the print library 120 is rewritten with the unauthorized manner by the vendor development program 110 can be prevented.

Further, the print library 120 can be configured such that the vendor development program 110 cannot read at least a part of the apparatus information (e.g., specific information in the apparatus information), for example, even when the vendor development program 110 is to read the apparatus information acquired from the apparatus 20. With this configuration, the manufacturer of the apparatus 20 can prevent the vendor development program 110 developed by the third vendor from referring to the apparatus information (e.g., specific information in the apparatus information) unnecessary, and degrading the security level of the apparatus 20.

In the first embodiment, it is assumed that the vendor development program 110 and the print library 120 are developed as programs using Java (registered trademark) language. Therefore, the class of Java is defined for the print library 120. The vendor development program 110 can acquire the apparatus information from the apparatus 20, and transmit a print request to the apparatus 20 by calling a method (e.g., API) defined in the class. However, the language used for the development of the vendor development program 110 and the print library 120 is limited not to Java (registered trademark) language. For example, the vendor development program 110 and the print library 120 can be developed using any programming languages, such as C language, C++, Objective-C language, C# language, or the like.

The print library 120 is provided by the manufacturer of the apparatus 20, but not limited thereto. For example, the print library 120 may be provided by a subsidiary company of the manufacturer of the apparatus 20. Further, the print library 120 may be also provided, for example, as a part of software development kit (SDK).

Figure 3:
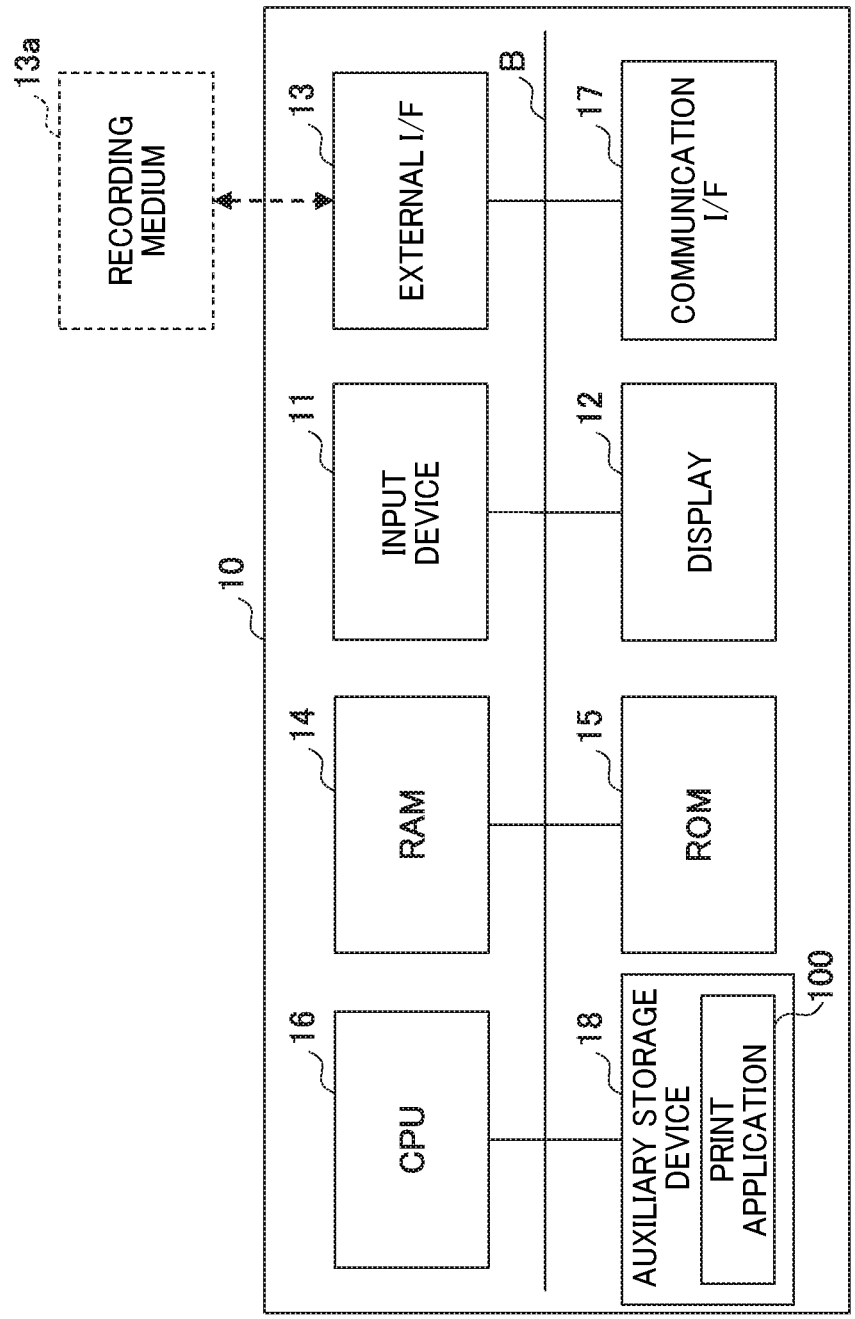
FIG. 3 illustrates an example of a hardware block diagram of a terminal device according to the first embodiment.

Hardware Configuration of Terminal Device:

Hereinafter, a description is given of a hardware configuration of the terminal device 10 of the first embodiment with reference to FIG. 3. FIG. 3 illustrates an example of a hardware block diagram of the terminal device 10 according to the first embodiment.

As illustrated in FIG. 3, the terminal device 10 includes, for example, an input device 11, a display 12, an external interface (I/F) 13, and a random access memory (RAM) 14. The terminal device 10 further includes, for example, a read only memory (ROM) 15, a central processing unit (CPU) 16, a communication interface (I/F) 17, and an auxiliary storage device 18. These hardware components are connected with each other via a bus B.

The input device 11 is, for example, a touch panel or the like, and is used by a user to input various operations. Further, the input device 11 may be, for example, a keyboard, a mouse, or the like.

The display 12 is a display device to display results of processing performed by the terminal device 10. The external I/F 13 is an interface to an external device. The external device is, for example, a recording medium 13a or the like. The terminal device 10 can read data from the recording medium 13a and write data to the recording medium 13a via the external I/F 13.

The recording medium 13a includes, for example, a universal serial bus (USB) memory, a secure digital (SD) memory card, a flexible disk, a compact disk (CD), a digital versatile disc (DVD), or the like.

The RAM 14 is a volatile semiconductor memory that temporarily stores one or more programs and data. The ROM 15 is a nonvolatile semiconductor memory capable of retaining one or more programs and data even when a power supply is turned off. For example, the ROM 15 stores one or more programs and data, such as basic input/output system (BIOS), operating system (OS) settings, and network settings to be executed when the terminal device 10 is activated.

The CPU 16 is a computing device that performs the controlling of the entire terminal device 10 and the processing by the terminal device 10 by reading and executing the program and data from the ROM 15 and the auxiliary storage device 18, and executing the program and data on the RAM 14.

The communication I/F 17 is an interface for the terminal device 10 to communicate with the apparatus 20. The communication I/F 17 includes, for example, a Bluetooth (registered trademark) module for communicating with the apparatus 20 via Bluetooth, and a wireless LAN module for communicating with the apparatus 20 via a wireless LAN such as Wi-Fi (registered trademark).

The auxiliary storage device 18 is, for example, a hard disk drive (HDD), a solid state drive (SSD), or the like, and is a nonvolatile storage device that stores programs and data. The programs and data stored in the auxiliary storage device 18 include a basic software that controls the terminal device 10, such as an operating system (OS), the print application 100, and one or more applications that provide various functions. The auxiliary storage device 18 manages the stored programs and data using a given file system and database (DB).

By employing the hardware configuration illustrated in FIG. 3, the terminal device 10 can implement various processing to be described later.

Figure 4:
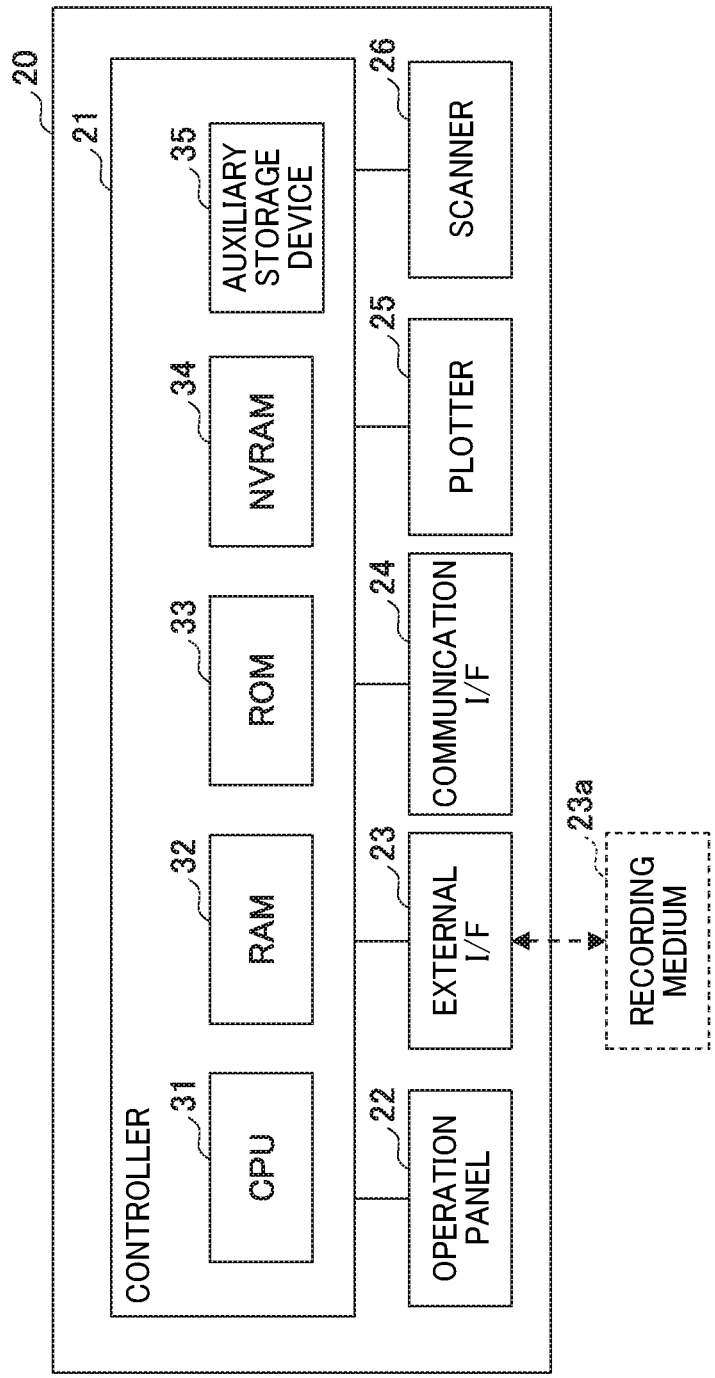
FIG. 4 illustrates an example of hardware block diagram of an apparatus according to the first embodiment.

Hardware Configuration of Apparatus:

Hereinafter, a description is given of a hardware configuration of the apparatus 20 when the apparatus 20 is an image processing apparatus, such as an MFP, with reference to FIG. 4. FIG. 4 illustrates an example of a hardware block diagram of the apparatus 20 according to the first embodiment.

As illustrated in FIG. 4, the apparatus 20 includes, for example, a controller 21, an operation panel 22, an external I/F 23, a communication I/F 24, a plotter 25, and a scanner 26. Further, the controller 21 includes, for example, a CPU 31, a RAM 32, a ROM 33, a non-volatile RAM (NVRAM) 34, and an auxiliary storage device 35.

The ROM 33 is a nonvolatile semiconductor memory capable of retaining programs and data even when a power supply is turned off. The RAM 32 is a volatile semiconductor memory that temporarily stores a program or data. The NVRAM 34 is a nonvolatile semiconductor memory that stores, for example, setting information. Further, the auxiliary storage device 35 is, for example, an HDD, a SSD, or the like, and is a nonvolatile storage device, which stores programs and data.

The CPU 31 is a computing device that performs the controlling and functions of the apparatus 20 entirely by reading and executing the program and data, and the setting information from the ROM 33, the NVRAM 34, and the auxiliary storage device 35 onto the RAM 32 and executing the program and data, and the setting information.

The operation panel 22 is an input/output device provided with an input unit for receiving an input from a user, and a display unit for displaying information. The external I/F 23 is an interface to communicate with an external device. The external device is, for example, a recording medium 23a. The apparatus 20 can read data from the recording medium 23a and write data to the recording medium 23a via the external I/F 23.

The recording medium 23a employs, for example, an integrated circuit (IC) card, a USB memory, an SD memory card, a flexible disk, a CD, and a DVD.

The communication I/F 24 is an interface for the apparatus 20 to communicate with the terminal device 10. The communication I/F 24 includes, for example, a Bluetooth (registered trademark) module for communicating with the terminal device 10 via Bluetooth, and a wireless local access network (LAN) module for communicating with the terminal device 10 via the wireless LAN. Further, the communication I/F 24 may include a LAN board or the like for communicating with the terminal device 10 via a wired LAN.

The plotter 25 is a device for printing print data on a print medium, such as sheet including paper. However, the print medium is not limited to paper. The print medium can be, for example, any sheet, such as overhead projector (OHP) sheet, plastic film, copper foil, and cloth. The scanner 26 is a device for scanning a document and generating image data.

By employing the hardware configuration illustrated in FIG. 4, the apparatus 20 can implement various processing to be described later.

Figure 5:
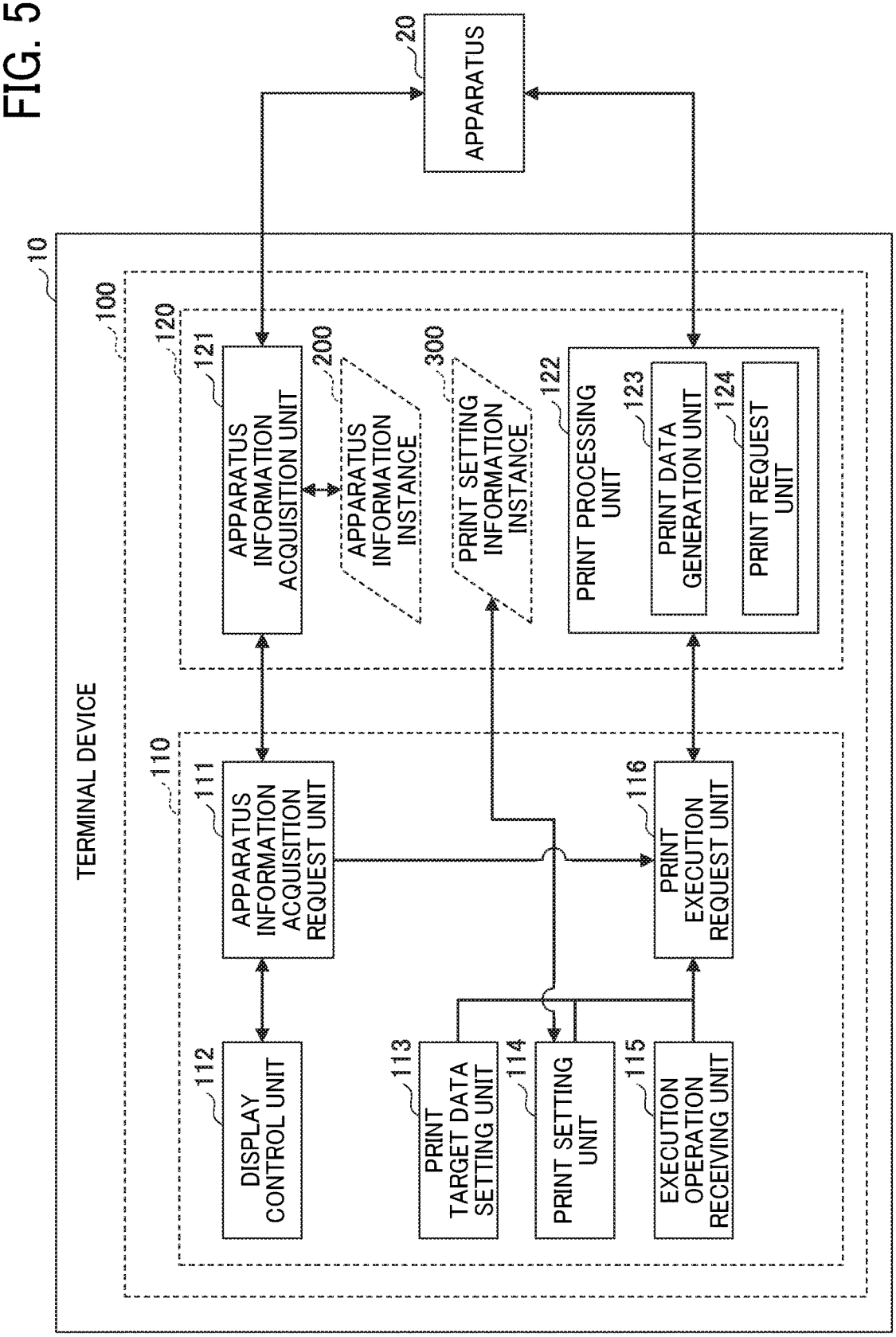
FIG. 5 illustrates an example of a functional block diagram of the terminal device according to the first embodiment.

Functional Configuration of Terminal Device:

Hereinafter, a description is given of a functional configuration of the terminal device 10 of the first embodiment with reference to FIG. 5. FIG. 5 illustrates an example of a functional block diagram of the terminal device 10 according to the first embodiment.

As illustrated in FIG. 5, the terminal device 10 includes, for example, an apparatus information acquisition request unit 111, a display control unit 112, a print target data setting unit 113, a print setting unit 114, an execution operation receiving unit 115, and a print execution request unit 116. These functional units are implemented by executing the vendor development program 110 using the CPU 16.

The terminal device 10 further includes, for example, an apparatus information acquisition unit 121, and a print processing unit 122. These functional units are implemented by processing executed by the CPU 16 using the print library 120.

The apparatus information acquisition request unit 111 receives an acquisition operation of apparatus information instructed by a user. When the apparatus information acquisition request unit 111 receives the acquisition operation of the apparatus information instructed by the user, the apparatus information acquisition request unit 111 requests the apparatus information acquisition unit 121 to acquire the apparatus information. The apparatus information acquisition request unit 111 can request the acquisition of the apparatus information by calling a method defined in a class (hereinafter, referred to as "apparatus information acquisition class 1300") that implements the apparatus information acquisition unit 121.

The display control unit 112 displays the apparatus information acquired by the apparatus information acquisition unit 121 on the display 12.

The print target data setting unit 113 receives a selection operation of print target data instructed by the user. The print target data is content data that the user desires to print. The content data includes, for example, image data such as photograph, and document data. When the apparatus 20 is a projector or an audio apparatus, the content data may be, for example, video data and audio data (e.g., music data).

When the print target data setting unit 113 receives the selection operation of the print target data instructed by the user, the print target data setting unit 113 sets the selected content data as the print target data.

The print setting unit 114 receives a designation operation of print setting information instructed by the user. The print setting information includes, for example, number of copies, a print page range, and a print color.

When the print setting unit 114 receives the designation operation of the print setting information instructed by the user, the print setting unit 114 generates a print setting information instance 300, in which each print setting information is retained. Then, the print setting unit 114 sets the print setting information designated by the user in the print setting information instance 300. The print setting unit 114 can set the print setting information by calling a method defined in a class (hereinafter, referred to as "print setting information class 1200") that implements the print setting information instance 300.

The execution operation receiving unit 115 receives a print execution operation instructed by the user. When the print execution operation is received by the execution operation receiving unit 115, the print execution request unit 116 requests the print processing unit 122 to execute a printing operation. The print execution request unit 116 can request the printing operation execution by calling a method defined in a class (hereinafter, referred to as "print processing class 1400") that implements the print processing unit 122.

In response to the request from the apparatus information acquisition request unit 111, the apparatus information acquisition unit 121 acquires the apparatus information from the apparatus 20. At this timing, the apparatus information acquisition unit 121 acquires the apparatus information from the apparatus 20 using, for example, a short-range wireless communication, such as Bluetooth (registered trademark). The apparatus information includes, for example, an internet protocol (IP) address, a model name, a support page description language (PDL), and a network information associated with the apparatus 20.

When the apparatus information acquisition unit 121 acquires the apparatus information from the apparatus 20, the apparatus information acquisition unit 121 generates an apparatus information instance 200 for retaining the acquired each apparatus information. Then, the apparatus information acquisition unit 121 sets the acquired apparatus information in the apparatus information instance 200. The apparatus information acquisition unit 121 can set the apparatus information by calling a method defined in a class (hereinafter, referred to as "apparatus information class 1100") that implements the apparatus information instance 200.

In response to the request from the print execution request unit 116, the print processing unit 122 generates print data, and transmits a print request to the apparatus 20. At this timing, the print processing unit 122 transmits the print request to the apparatus 20 using the wireless LAN, such as Wi-Fi (registered trademark).

As illustrated in FIG. 5, the print processing unit 122 includes, for example, a print data generation unit 123, and a print request unit 124. The print data generation unit 123 generates print data. The print data is generated by converting the print target data into data described with a data format (e.g., PDL supported by the apparatus 20) that can be interpreted by the apparatus 20. The print request unit 124 transmits the print request including the print data, generated by the print data generation unit 123, to the apparatus 20.

Hereinafter, a description is given of the apparatus information instance 200 with reference to FIG. 6. FIG. 6 illustrates an example of the apparatus information instance 200.

As illustrated in FIG. 6, the apparatus information instance 200 retains, for example, apparatus information corresponding to field names of, such as "IP address," "model name," "support PDL," and "network information."

As to the apparatus information corresponding to the field name of "IP address," an IP address of the apparatus 20 is set as a field value. Further, a reading range of the apparatus information corresponding to the field name of "IP address" is set "whole range," and a rewriting range is set "within library." This indicates that the apparatus information corresponding to the field name of "IP address" can be also read by a program (e.g., vendor development program 110) different from the print library 120, but cannot be rewritten by the program (e.g., vendor development program 110) different from the print library 120, which means the vendor development program 110 cannot update the field value.

As to the apparatus information corresponding to the field name of "model name," a model name (e.g., model number) of the apparatus 20 is set as a field value. Further, the reading range of the apparatus information corresponding to the field name of "model name" is set "whole range," and the rewriting range of the apparatus information corresponding to the field name of "model name" is set "within library." This indicates that the apparatus information corresponding to the field name of "model name" can be also read from a program (e.g., vendor development program 110) different from the print library 120, but cannot be rewritten by the program (e.g., vendor development program 110) different from the print library 120.

As to the apparatus information corresponding to the field name of "support PDL," a data format name interpretable by the apparatus 20 is set as a field value. Further, the reading range and the rewriting range of the apparatus information corresponding to the field name of "support PDL" are set "within library." This indicates that the apparatus information corresponding to the field name of "support PDL" cannot be read and rewritten by a program (e.g., vendor development program 110) different from the print library 120.

As to the apparatus information corresponding to the field name of "network information," a service set identifier (SSID) of the apparatus 20, an encryption method of the apparatus 20, a password of an access point, or the like are set as field values. Further, the reading range and the rewriting range of the apparatus information corresponding to the field name of "network information" are set "within library." This indicates that the apparatus information corresponding to the field name of "network information" cannot be read and rewritten by a program (e.g., vendor development program 110) different from the print library 120.

As described above, the apparatus information instance 200 is set with the reading range and the rewriting range of the apparatus information retained by the apparatus information instance 200. With this configuration, the manufacturer of the apparatus 20 can prevent the vendor development program 110 developed by the third vendor from referring to the apparatus information (e.g., specific information in the apparatus information) unnecessary and rewriting of the apparatus information (e.g., specific information in the apparatus information) with the unauthorized manner. Further, the apparatus information retained by the apparatus information instance 200 is not limited to the above described "IP address," "model name," "support PDL," and "network information." For example, the apparatus information instance 200 may retain various apparatus information, such as an apparatus serial number, an apparatus manufactured date, and information of manufacturer. The apparatus serial number can be used as the identification information identifying the apparatus 20.

Hereinafter, a description is given of the print setting information instance 300 with reference to FIG. 7. FIG. 7 illustrates an example of the print setting information instance 300.

As illustrated in FIG. 7, the print setting information instance 300 retains print setting information corresponding to field names of, such as "number of copies," "print page range," and "print color."

As to the printing setting information corresponding to the field name of "number of copies," the number of printing copies designated by a user (or the number of default printing copies) is set as a field value. Further, the reading range and the rewriting range of the print setting information corresponding to the field name of "number of copies" are set "whole range." This indicates that print setting information corresponding to the field name of "number of copies" can be read and rewritten from a program (e.g., vendor development program 110) different from the print library 120.

As to the printing setting information corresponding to the field name of "print page range," a print page range designated by the user (or a default print page range) is set as a field value. Further, the reading range and the rewriting range of the print setting information corresponding to the field name of "print page range" are set "whole range." This indicates that the print setting information corresponding to the field name of "print page range" can be read and rewritten from a program (e.g., vendor development program 110) different from the print library 120.

As to the printing setting information corresponding to the field name of "print color," a print color designated by the user (or a default print color) is set as a field value. Further, the reading range and the rewriting range of the print setting information corresponding to the field name of "print color" are set "whole range." This indicates that the print setting information corresponding to the field name of "print color" can be read and rewritten from a program (e.g., vendor development program 110) different from the print library 120.

As described above, as to the print setting information instance 300, the reading range and the rewriting range of the print setting information retained by the print setting information instance 300 are set. With this configuration, the manufacturer of the apparatus 20 can prevent the vendor development program 110 developed by the third vendor from referring to the printing setting information (e.g., specific information in the printing setting information) unnecessary, and, for example, rewriting of the print setting information applying only the default value. Further, the print setting information retained by the print setting information instance 300 is not limited to the above described "number of copies", "print page range," and "print color." For example, the print setting information instance 300 may retain various print setting information, such as whether a copy-forgery-inhibited pattern is printed, whether page data are combined, and whether duplex printing is performed.

In this configuration, the reading range and the rewriting range of the apparatus information instance 200 and the print setting information instance 300 can be implemented by using a package of Java (registered trademark) language. For example, as illustrated in FIG. 8, a first package to which each class defined in the vendor development program 110 belongs, and a second package to which each class defined in the print library 120 belongs are prepared as different packages.

In this configuration, by defining an access level for a method for operating the concerned field value (i.e., apparatus information) retained by the apparatus information instance 200, the reading range and the rewriting range of the concerned field value can be restricted, such as prohibited. Similarly, by defining an access level for a method for operating the concerned field value (i.e., print setting information) retained by the print setting information instance 300, the reading range and the rewriting range of the concerned field value can be restricted, such as prohibited. Hereinafter, a name of a package that each class defined in the print library 120 belongs is referred to as the package name of "printlibrary."

Figure 8:
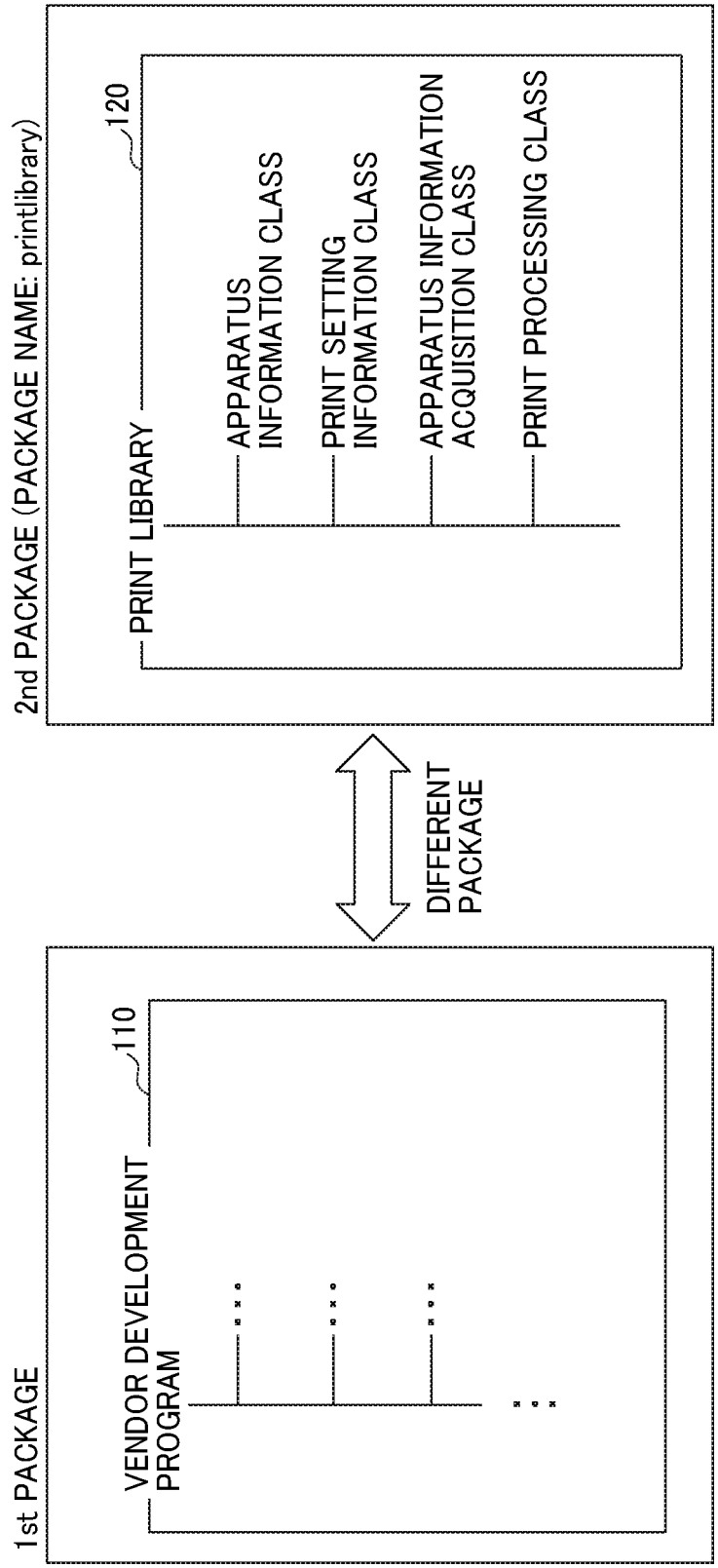
FIG. 8 illustrates an example of a relationship between a package of a vendor development program and a package of a print library according to the first embodiment.

In an example case illustrated in FIG. 8, each class defined in the vendor development program 110 belongs to the same package (i.e., first package), but not limited to thereto. For example, each class can belong to different packages.

Hereinafter, a description is given of an apparatus information class 1100 for implementing the apparatus information instance 200 with reference to FIG. 9. FIG. 9 illustrates an example of the apparatus information class 1100. The apparatus information instance 200 is generated by instantiating, for example, the apparatus information class 1100 illustrated in FIG. 9.

As illustrated in FIG. 9, the apparatus information class 1100 includes, for example, a package declaration 1101, and a class declaration 1102. The package declaration 1101 defines the package name of "printlibrary." The class declaration 1102 includes method declarations 1103 to 1110 corresponding to each apparatus information as illustrated in FIG. 9.

The method declaration 1103 defines a method of "getIPAddress" for acquiring or reading the apparatus information corresponding to the field name of "IP address." Further, in the method declaration 1103, a modifier of "public" indicating an access level of the method of "getIPAddress" is defined (hereinafter, referred to as an "access modifier" of "public"). Therefore, the method of "getIPAddress" can be also called from a class belonging to a package different from the package of the print library 120 (i.e., a class defined in a program different from the print library 120). With this configuration, the reading range of "whole range" of the apparatus information corresponding to the field name of "IP address" is implemented, and the apparatus information can be also read from the vendor development program 110, which is the package (i.e., first package) different from the second package (e.g., print library 120).

The method declaration 1104 defines a method of "setIPAddress" for updating or rewriting the apparatus information corresponding to the field name of "IP address." Further, in the method declaration 1104, no access modifier is defined for the method of "setIPAddress." Therefore, the method of "setIPAddress" can be called only from a class in the package that is the same package of the print library 120 (i.e., a class defined in the print library 120). With this configuration, the rewriting range "within library" of the apparatus information corresponding to the field name of "IP address" is implemented, and the apparatus information corresponding to the field name of "IP address" cannot be rewritten from a program (e.g., the vendor development program 110) different from the print library 120. Further, if the access modifier is not defined for the method, then the access level of the method can be called only from the package that is the same package of the print library 120. That is, in this case, the method cannot be called from the vendor development program 110 that is not the same package (e.g., print library 120).

The method declaration 1105 defines a method of "getModelName" for reading the apparatus information corresponding to the field name of "model name." Further, the method declaration 1105 defines the access modifier of "public" for the method of "getModelName." With this configuration, similar to the method of "getIPAddress," the reading range of "whole range" of the apparatus information corresponding to the field name of "model name" is implemented.

The method declaration 1106 defines a method of "setModelName" for rewriting the apparatus information corresponding to the field name of "model name." Further, in the method declaration 1106, no access modifier is defined for the method of "setModelName." With this configuration, similar to the method of "setIPAddress," the rewriting range of "within library" of the apparatus information corresponding to the field name of "model name" is implemented.

The method declaration 1107 defines a method of "getSupportPDL" for reading the apparatus information corresponding to the field name of "support PDL." Further, in the method declaration 1107, no access modifier is defined for the method of "getSupportPDL." With this configuration, similar to the above, the reading range of "within library" of the apparatus information corresponding to the field name of "support PDL" is implemented.

The method declaration 1108 defines a method of "setSupportPDL" for rewriting the apparatus information corresponding to the field name of "Support PDL." Further, in the method declaration 1108, no access modifier is defined for the method of "setSupportPDL." With this configuration, similar to the above, the rewriting range of "within library" of the apparatus information corresponding to the field name of "support PDL" is implemented.

The method declaration 1109 defines a method of "getNetworkInfo" for reading the apparatus information corresponding to the field name of "network information." Further, in the method declaration 1109, no access modifier is defined for the method of "getNetworkInfo." With this configuration, similar to the above, the reading range of "within library" of the apparatus information corresponding to the field name of "network information" is implemented.

The method declaration 1110 defines a method of "setNetworkInfo" for rewriting the apparatus information corresponding to the field name of "network information." Further, in the method declaration 1108, no access modifier is defined for the method of "setNetworkInfo." With this configuration, similar to the above, the rewriting range of "within library" of the apparatus information corresponding to the field name of "network information" is implemented.

As to the above described apparatus information class 1100, the access modifier of "public" is defined for one or more methods for operating (e.g., reading, rewriting) some information in the apparatus information, with which some information in the apparatus information can be operated from a class belonging to a different package. Further, as to the above described apparatus information class 1100, if the access modifier is not defined for one or more methods for operating some information in the apparatus information, some information in the apparatus information cannot be operated from a class belonging to the different package.

Further, the apparatus information used for the apparatus information instance 200 may be set, for example, at the time of generating the apparatus information instance 200. In this case, it is required to define a method (constructor), which performs the initializing of the apparatus information by receiving an initial setting parameter as an argument, in the program code of the vendor development program 110. The method (constructor) is defined in a way such that receiving the IP address, model name, support PDL and network information as the argument, and acquiring the IP address, model name, support PDL, and network information using each method defined in the method declarations 1103, 1105, 1107, and 1109. Further, if the apparatus information is not changed after generating the apparatus information instance 200, the method declarations 1104, 1106, 1108, and 1110 are not required, in which these method declarations are not required to be defined in the apparatus information class 1100.

Hereinafter, a description is given of a print setting information class 1200 for implementing the print setting information instance 300 with reference to FIG. 10. FIG. 10 illustrates an example of the print setting information class 1200. The print setting information instance 300 is generated by instantiating, for example, the print setting information class 1200 illustrated in FIG. 10.

As illustrated in FIG. 10, the print setting information class 1200 includes, for example, a package declaration 1201, and a class declaration 1202. The package declaration 1201 defines the package name of "printlibrary." The class declaration 1202 includes method declarations 1203 to 1208 for each print setting information.

The method declaration 1203 defines a method of "getCopies" for reading the print setting information corresponding to the field name of "number of copies." Further, the method declaration 1203 defines the access modifier of "public" for the method of "getCopies." With this configuration, similar to the above described apparatus information class 1100, the reading range of "whole range" of the print setting information corresponding to the field name of "number of copies" is implemented.

The method declaration 1204 defines a method of "setCopies" for rewriting the print setting information corresponding to the field name of "number of copies." Further, the method declaration 1204 defines the access modifier of "public" for the method of "setCopies." With this configuration, similar to the above described apparatus information class 1100, the rewriting range of "whole range" of the printing setting information corresponding to the field name of "number of copies" is implemented.

The method declaration 1205 defines a method of "getPrintPage" for reading the print setting information corresponding to the field name of "print page range." Further, the method declaration 1205 defines the access modifier of "public" for the method of "getPrintPage." With this configuration, similar to the above, the reading range of "whole range" of the print setting information corresponding to the field name of "print page range" is implemented.

The method declaration 1206 defines a method of "setPrintPage" for rewriting the print setting information corresponding to the field name of "print page range." Further, the method declaration 1206 defines the access modifier of "public" for the method of "setPrintPage." With this configuration, similar to the above, the rewriting range of "whole range" of the print setting information corresponding to the field name of "print page range" is implemented.

The method declaration 1207 defines a method of "getColor" for reading the print setting information corresponding to the field name of "print color." Further, the method declaration 1207 defines the access modifier of "public" for the method of "getColor." With this configuration, similar to the above, the reading range of "whole range" of the print setting information corresponding to the field name of "print color" is implemented.

The method declaration 1208 defines a method of "setColor" for rewriting the print setting information corresponding to the field name of "print color." Further, the method declaration 1208 defines the access modifier of "public" for the method of "setColor." With this configuration, similar to the above, the reading range of "whole range" of the print setting information corresponding to the field name of "print color" is implemented.

As to the above described print setting information class 1200, the access modifier of "public" is defined for one or more methods for operating (e.g., reading, rewriting) the print setting information, with which the print setting information can be operated from a class belonging to a different package. Further, as to the above described print setting information class 1200, if the access modifier is not defined for one or more methods for operating the print setting information, the print setting information cannot be operated from a class belonging to the different package.

Hereinafter, a description is given of an apparatus information acquisition class 1300 for implementing the apparatus information acquisition unit 121 with reference to FIG. 11. FIG. 11 illustrates an example of the apparatus information acquisition class 1300. The apparatus information acquisition unit 121 is generated by instantiating, for example, the apparatus information acquisition class 1300 illustrated in FIG. 11.

As illustrated in FIG. 11, the apparatus information acquisition class 1300 includes, for example, a package declaration 1301, and a class declaration 1302. The package declaration 1301 defines the package name of "printlibrary." The class declaration 1302 includes a method declaration 1303.

The method declaration 1303 defines a method of "getMfpInfo" for acquiring or reading the apparatus information from the apparatus 20. Further, the method declaration 1303 defines the access modifier of "public" for the method of "getMfpInfo." With this configuration, the method of "getMfpInfo" can be also called from a class that belongs to a package different from the package of the print library 120 (i.e., a class defined in a program different from the print library 120).

Hereinafter, a description is given of a print processing class 1400 for implementing the print processing unit 122 with reference to FIG. 12. FIG. 12 illustrates an example of the print processing class 1400. The print processing unit 122 is generated by instantiating, for example, the print processing class 1400 illustrated in FIG. 12.

As illustrated in FIG. 12, the print processing class 1400 includes, for example, a package declaration 1401, and a class declaration 1402. The package declaration 1401 defines the package name of "printlibrary." The class declaration 1402 includes a method declaration 1403.

The method declaration 1403 defines a method of "print" for transmitting a print request to the apparatus 20. Further, the method declaration 1403 defines the access modifier of "public" for the method of "print." With this configuration, the method of "print" can be also called from a class belonging to a package different from the package of the print library 120 (i.e., a class defined in a program different from the print library 120).

Further, the method declaration 1403 defines "MfpInfo info," "PrintData data," and "PrintSetting setting" as the arguments of the method of "print." This indicates that the apparatus information, the print target data, and the print setting information are designated as the arguments of the method of "print."

Hereinafter, a description is given of a program code 1500 of the vendor development program 110 with reference to FIG. 13. FIG. 13 illustrates an example of the program code 1500 of the vendor development program 110. FIG. 13 illustrates an example of the program code 1500 that defines each code, respectively corresponding to the apparatus information acquisition request unit 111, the print target data setting unit 113, the print setting unit 114, and the print execution request unit 116. Further, the codes, respectively corresponding to the display control unit 112 and the execution operation receiving unit 115, are required to be defined separately.

As illustrated in FIG. 13, the program code 1500 includes, for example, a package declaration 1501, and a class declaration 1502. The package declaration 1501 defines a package name of "printapp." Therefore, the vendor development program 110 cannot call one or more methods not defined with the access modifier of "public," from the method defined in each of the classes belonging to the package name of "printlibrary."

The class declaration 1502 includes a print execution class 1503. The print execution class 1503 includes, for example, a code definition 1504 defined with a code corresponding to the apparatus information acquisition request unit 111, and a code definition 1505 defined with a code corresponding to the print setting unit 114. The print execution class 1503 further includes, for example, a code definition 1506 defined with a code corresponding to the print target data setting unit 113, and a code definition 1507 defined with a code corresponding to the print execution request unit 116.

As indicated in the code definition 1507, the vendor development program 110 designates an "info" indicating the apparatus information instance 200 as the argument when calling the method of "print" of the print processing class 1400 belonging to the package name of "printlibrary." With this configuration, in a case of processing the method of "print," the method not defined with the access modifier of "public" of the apparatus information instance 200 can be called, and then a processing request (e.g., print request) can be transmitted to the apparatus 20. For example, in a case of processing the method of "print," by calling the method of "getSupportPDL" corresponding to "info" indicating the apparatus information instance 200 and acquiring the apparatus information corresponding to the field name of "support PDL," the printing request designating the acquired apparatus information can be transmitted to the apparatus 20.

Therefore, the print application 100 can transmit the processing request (e.g., print request) to the apparatus 20 using the information that the vendor development program 110 cannot operate (e.g., apparatus information corresponding to the field name of "support PDL" and apparatus information corresponding to the field name of "network information").

Printing Process:

Hereinafter, a description is given of a printing process of the printing system 1 of the first embodiment. Hereinafter, a description is given of a process when a user of the terminal device 10 performs printing using the apparatus 20 using the print application 100 with reference to FIG. 14. FIG. 14 is an example of a sequence diagram of the printing process according to the first embodiment.

Hereinafter, it is assumed in FIG. 14 that each class defined in the vendor development program 110 and the print library 120 are already instantiated except the apparatus information class 1100 and the print setting information class 1200. Further, some of the classes defined in the vendor development program 110 and the print library 120 may not be yet instantiated in some case. In this case, the not-instantiated class is instantiated as needed before executing the processing of a functional unit (instance) implemented by the corresponding class. Further, the apparatus information class 1100 and the print setting information class 1200 can be also instantiated in advance in some case.

At first, the apparatus information acquisition request unit 111 of the vendor development program 110 receives an acquisition operation of the apparatus information instructed by a user (step S101). For example, when the user performs an operation of selecting a specific apparatus from the list of apparatuses 20 located near the user on a given screen displayed by using the display control unit 112, the user can perform the acquisition operation of the apparatus information. Alternatively, for example, QR code (registered trademark) attached to a housing of the apparatus 20 can be captured by a camera of the terminal device 10 to perform the acquisition operation of the apparatus information.

When the apparatus information acquisition request unit 111 of the vendor development program 110 receives the acquisition operation of the apparatus information instructed by the user, the apparatus information acquisition request unit 111 requests the apparatus information acquisition unit 121 to acquire the apparatus information (step S102). The apparatus information acquisition request unit 111 can generate the request for acquiring the apparatus information by calling the method of "getMfpInfo" defined in the method declaration 1303 of the apparatus information acquisition class 1300.

When the apparatus information acquisition unit 121 of the print library 120 receives the request for acquiring the apparatus information, the apparatus information acquisition unit 121 transmits an inquiry of the apparatus information to the apparatus 20 (step S103). For example, the apparatus information acquisition unit 121 can inquire the apparatus information to the apparatus 20 using a short-range wireless communication, such as Bluetooth (registered trademark). The short-range wireless communication is not limited to Bluetooth (registered trademark), but can be, for example, Bluetooth Low Energy (BLE), Zigbee, or the like. Further, infrared rays, radio frequency identification (RFID) or the like may be used for the short-range wireless communication.

Then, the apparatus information acquisition unit 121 receives the apparatus information returned from the apparatus 20 in response to the above inquiry. With this configuration, the apparatus information acquisition unit 121 can acquire the apparatus information, such as IP address, model name, support PDL, and network information, from the apparatus 20.

In the above described step S103, the apparatus information is acquired from the apparatus 20 using the short-range wireless communication such as Bluetooth (registered trademark), but not limited thereto. For example, the apparatus information acquisition unit 121 can capture QR code (registered trademark) attached on a housing of the apparatus 20 using a camera to acquire the apparatus information embedded in the QR code. Alternatively, the apparatus information acquisition unit 121 can acquire the apparatus information from the apparatus 20 using a wireless communication (e.g., Wi-Fi) other than the short-range wireless communication. For example, the terminal device 10 can be configured to notify the IP address of the terminal device 10 to the apparatus 20 to acquire the apparatus information from the apparatus 20 using the wireless communication, such as Wi-Fi, as a response to the notification.

When the apparatus information acquisition unit 121 of the print library 120 acquires the apparatus information from the apparatus 20, the apparatus information acquisition unit 121 generates the apparatus information instance 200 (step S104). Specifically, the apparatus information instance 200 is generated by instantiating the apparatus information class 1100.

Then, the apparatus information acquisition unit 121 of the print library 120 sets the apparatus information acquired from the apparatus 20 in the apparatus information instance 200 (step S105).

That is, the apparatus information acquisition unit 121 designates the IP address acquired from the apparatus 20 as the argument to call the method of "setIPAddress" defined in the method declaration 1104 of the apparatus information class 1100. With this configuration, the apparatus information corresponding to the field name of "IP address" is set in the apparatus information instance 200.

Similarly, the apparatus information acquisition unit 121 designates the model name acquired from the apparatus 20 as the argument to call the method of "setModelName" defined in the method declaration 1106 of the apparatus information class 1100. With this configuration, the apparatus information corresponding to the field name of "model name" is set in the apparatus information instance 200.

Similarly, the apparatus information acquisition unit 121 designates the support PDL acquired from the apparatus 20 as the argument to call the method of "setSupportPDL" defined in the method declaration 1108 of the apparatus information class 1100. With this configuration, the apparatus information corresponding to the field name of "support PDL" is set in the apparatus information instance 200.

Similarly, the apparatus information acquisition unit 121 designates the network information acquired from the apparatus 20 as the argument to call the method of "setNetworkInfo" defined in the method declaration 1110 of the apparatus information class 1100. With this configuration, the apparatus information corresponding to the field name of "network information" is set in the apparatus information instance 200.

Then, the apparatus information acquisition unit 121 returns the apparatus information instance 200, set with each apparatus information acquired from the apparatus 20, to the vendor development program 110.

Then, the display control unit 112 of the vendor development program 110 acquires the apparatus information from the apparatus information instance 200, returned from the apparatus information acquisition unit 121. Then, the display control unit 112 displays the apparatus information acquired from the apparatus information instance 200 on the display 12 (step S106).

In step S106, the display control unit 112 can acquire the apparatus information corresponding to the field name including the reading range of "whole range" from the apparatus information retained in the apparatus information instance 200. That is, the display control unit 112 can acquire the apparatus information corresponding to the field name of "IP address" and the apparatus information corresponding to the field name of "model name" from the apparatus information instance 200. By calling the method of "getIPAddress" defined in the method declaration 1103 of the apparatus information class 1100, the display control unit 112 can acquire the apparatus information corresponding to the field name of "IP address" from the apparatus information instance 200. Similarly, by calling the method of "getModelName" defined in the method declaration 1105 of the apparatus information class 1100, the display control unit 112 can acquire the apparatus information corresponding to the field name of "model name."

Further, the display control unit 112 can use the above acquired apparatus information to restrict one or more options displayed on a screen for receiving the designation operation of printing setting information in step S109, to be described later. For example, when the display control unit 112 determines that the apparatus 20 corresponds to only to monochrome printing based on the apparatus information corresponding to the field name of "model name," the display control unit 112 restricts designation of an option item, such as "color" cannot be designated as the print setting information (e.g., not to display an option item for selecting "color" on the display 12).

Further, for example, if the apparatus information of a plurality of apparatuses 20 is acquired, the display control unit 112 generates and displays an apparatus list screen used for selecting the apparatus 20, to be used as an output destination, by a user based on the acquired apparatus information of the plurality of apparatuses 20. When the apparatus list screen is displayed, the user can select the apparatus 20 (e.g., at least one apparatus 20 used for printing) from the plurality of apparatuses 20.

On the other hand, the display control unit 112 cannot acquire the apparatus information corresponding to the field name of "support PDL" and the apparatus information corresponding to the field name of "network information" from the apparatus information instance 200.

Therefore, the display control unit 112 displays the IP address and the model name of the apparatus 20 on the display 12. With this configuration, for example, a situation of displaying the apparatus information (e.g., supporting PDL, network information), which is not necessarily referred by the user, can be prevented.

Figure 15:
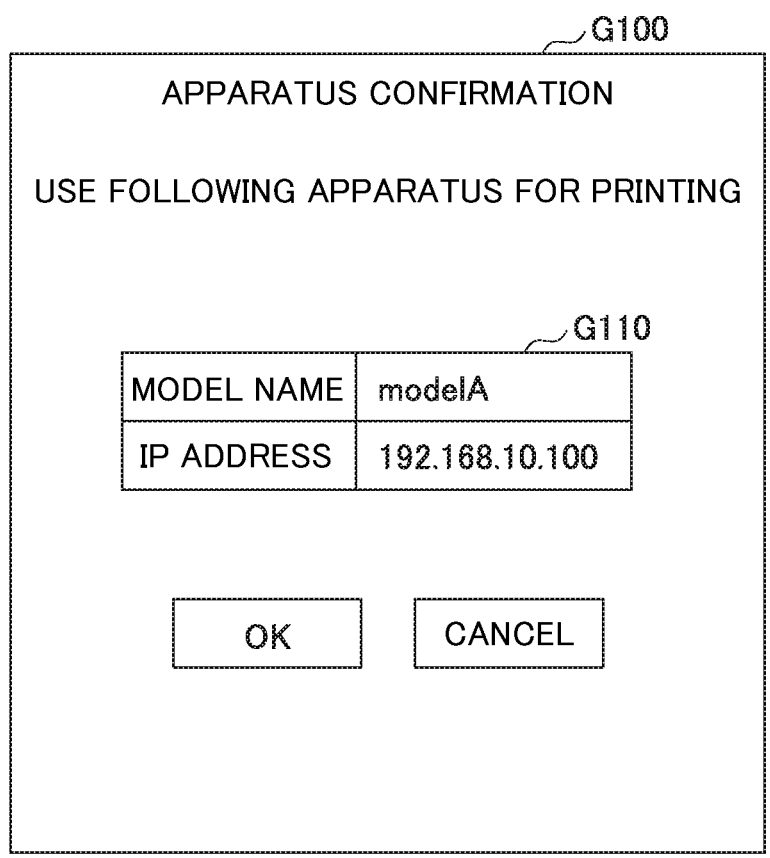
FIG. 15 illustrates an example of an apparatus confirmation screen according to the first embodiment.

FIG. 15 illustrates an apparatus confirmation screen G100 for checking and confirming the apparatus information of the apparatus 20 that performs the printing, which is an example of a screen displayed on the display 12 in step S106. FIG. 15 illustrates an example of the apparatus confirmation screen G100.

As illustrated in FIG. 15, the apparatus confirmation screen G100 includes an apparatus information display field G110. The apparatus information display field G110 displays the apparatus information that can be acquired from the apparatus information instance 200, such as the apparatus information set with the reading range of "whole range." More specifically, the apparatus information display field G110 displays the apparatus information corresponding to the field name of "IP address," and the apparatus information corresponding to the field name of "model name" set with the reading range of "whole range." As above described, the display control unit 112 displays the apparatus information set with the reading range of "whole range," among the apparatus information retained in the apparatus information instance 200, in the apparatus information display field G110.

On the other hand, the display control unit 112 cannot display the apparatus information that cannot be acquired from the apparatus information instance 200 in the apparatus information display field G110. That is, the display control unit 112 cannot display the apparatus information set with the reading range of "within library" in the apparatus information display field G110. More specifically, the display control unit 112 cannot display the apparatus information corresponding to the field name of "support PDL," and the apparatus information corresponding to the field name of "network information," set with the reading range of "within library," in the apparatus information display field G110.

Then, the print target data setting unit 113 of the vendor development program 110 receives a selection operation of print target data instructed by the user (step S107). For example, in step S106, the user can change one screen displaying the apparatus information to another screen displaying a list of content data, and then the user can select desired content data from the list of content data to perform the selection operation of the print target data in step S107.

When the print target data setting unit 113 of the vendor development program 110 receives the selection operation of the print target data instructed by the user, the print target data setting unit 113 sets the selected content data as the print target data (step S108). If the print target data is already set in advance before performing step S101, steps S107 and S108 can be omitted.

Then, the print setting unit 114 of the vendor development program 110 receives a designation operation of the print setting information instructed by the user (step S109). For example, the user can designate a set value of each of the print setting information on a given screen, displayed after selecting the print target data, to perform the designation operation of the print setting information. If the user has no intension to change the print setting information (e.g., if the default value is used as the set value of the print setting information), step S109 can be omitted.

The print setting unit 114 of the vendor development program 110 generates the print setting information instance 300 (step S110). Specifically, the print setting information instance 300 is generated by instantiating the print setting information class 1200.

Then, the print setting unit 114 of the vendor development program 110 sets the print setting information, designated by the user in step S109, in the print setting information instance 300 (step S111).

That is, the print setting unit 114 designates the number of copies designated by the user as the argument to call the method of "setCopies" defined in the method declaration 1204 of the print setting information class 1200. With this configuration, the print setting information corresponding to the field name of "number of copies" is set in the print setting information instance 300.

Similarly, the print setting unit 114 designates the print page range designated by the user as the argument to call the method of "setPrintPage" defined in the method declaration 1206 of the print setting information class 1200. With this configuration, the print setting information corresponding to the field name of "print page range" is set in the print setting information instance 300.

Similarly, the print setting unit 114 designates the print color designated by the user as the argument to call the method of "setColor" defined in the method declaration 1208 of the print setting information class 1200. With this configuration, the print setting information corresponding to the field name of "print color" is set in the print setting information instance 300.

Further, if only a part of the print setting information is designated by the user (e.g., when the number of copies alone is designated) in step S109, the print setting unit 114 sets the print setting information designated by the user alone in the print setting information instance 300.

Further, if each of the print setting information retained by the print setting information instance 300 is not initialized to the default value, the print setting unit 114 may set the default value of the print setting information in the print setting information instance 300 for one or more of the print setting information not designated with a value by the user.

Then, the execution operation receiving unit 115 of the vendor development program 110 receives a print execution operation instructed by the user (step S112). For example, the user can perform the print execution operation by pressing a print execution button on a given screen displayed after designating the print setting information.

When the execution operation receiving unit 115 receives the print execution operation, the print execution request unit 116 of the vendor development program 110 requests the print processing unit 122 to execute the printing operation (step S113). The print execution request includes the apparatus information instance 200, the print target data, and the print setting information instance 300. The print execution request unit 116 can request the print execution by designating the apparatus information instance 200, the print target data, and the print setting information instance 300 as the arguments, and then calling the method of "print" defined in the method declaration 1403 of the print processing class 1400.

For example, if the number of the apparatus information instance 200 is plural (i.e., if a plurality of apparatuses 20 exists in the surroundings, and the apparatus information is acquired from the plurality of apparatuses 20, respectively), by designating the apparatus information instance 200 as the argument for the method of "print," which apparatus information instance 200 is to be used can be designated. Therefore, a plurality of pieces of information that cannot be operated from the vendor development program 110 can be managed.

For example, if the number of the apparatus information instance 200 is plural, the apparatus information corresponding to the field name of "support PDL" exists for each of the apparatuses 20. In this case, the apparatus information corresponding to the field name of "support PDL" cannot be referred from the vendor development program 110. Although the vendor development program 110 cannot directly designate one specific apparatus information from the plurality of the apparatus information, the vendor development program 110 can indirectly designate the support PDL of the to-be-used apparatus 20 by designating the apparatus information instance 200.

The print processing unit 122 of the print library 120 acquires the support PDL from the apparatus information instance 200 included in the print execution request using the print data generation unit 123 (step S114). That is, the print data generation unit 123 acquires the apparatus information corresponding to the field name of "support PDL" from the apparatus information retained in the apparatus information instance 200. By calling the method of "getSupprotPDL" defined in the method declaration 1107 of the apparatus information class 1100, the print data generation unit 123 can acquire the apparatus information corresponding to the field name of "support PDL." Since the print processing class 1400 that implements the print processing unit 122 and the apparatus information class 1100 belong to the same package of "printlibrary," the print data generation unit 123 can call the method of "getSupprotPDL."

Then, the print processing unit 122 of the print library 120 acquires each print setting information from the print setting information instance 300 included in the print execution request using the print data generation unit 123 (step S115). That is, the print data generation unit 123 acquires each print setting information retained in the print setting information instance 300. The print data generation unit 123 can acquire each print setting information by calling the method defined in the method declaration 1203, the method defined in the method declaration 1205, and the method defined in the method declaration 1207 included in the print setting information class 1200.

Then, the print processing unit 122 of the print library 120 instructs the print data generation unit 123 to generate print data (step S116). That is, the print data generation unit 123 generates the print data from the print target data using the support PDL acquired in step S114, and the print setting information acquired in step S115. In step S116, the print data generation unit 123 generates the print data described with a data format corresponding to the support PDL acquired in step S114.

Then, the print processing unit 122 of the print library 120 acquires the network information from the apparatus information instance 200 included in the print execution request using the print request unit 124 (step S117). That is, the print request unit 124 acquires the apparatus information corresponding to the field name of "network information" from the apparatus information retained in the apparatus information instance 200. By calling the method of "getNetworkInfo" defined in the method declaration 1109 of the apparatus information class 1100, the print request unit 124 can acquire the apparatus information corresponding to the field name of "network information." Since the print processing class 1400 that implements the print processing unit 122 and the apparatus information class 1100 belong to the same package of "printlibrary," the print request unit 124 can call the method of "getNetworkInfo."

Then, the print processing unit 122 of the print library 120 determines whether communication with the apparatus 20 can be established based on the network information, acquired in step S117, using the print request unit 124 (step S118). That is, the print request unit 124 compares, for example, a service set identifier (SSID) included in the network information, acquired in step S117, and a SSID of an access point to which the terminal device 10 is to be connected to determine whether the terminal device 10 and the apparatus 20 can communicate with each other.

For example, the determination whether the communication can be established is performed by comparing the two SSIDs and determining whether the terminal device 10 and the apparatus 20 exist in the same network. Further, the determination whether the communication can be established is performed differently. For example, it can be determined whether the terminal device 10 and the apparatus 20 can communicate with each other by comparing a communication method of the terminal device 10 and a communication method of the apparatus 20.

If the print processing unit 122 of the print library 120 determines that the terminal device 10 can communicate with the apparatus 20 in step S118, the print processing unit 122 of the print library 120 acquires the IP address from the apparatus information instance 200 included in the print execution request using the print request unit 124 (step S119). That is, the print request unit 124 acquires the apparatus information corresponding to the field name of "IP address" from the apparatus information retained in the apparatus information instance 200. By calling the method of "getIPAddress" defined in the method declaration 1103 of the apparatus information class 1100, the print request unit 124 can acquire the apparatus information corresponding to the field name of "IP address."

Then, the print processing unit 122 of the print library 120 transmits a print request to the apparatus 20 using the print request unit 124 (step S120). That is, the print request unit 124 transmits the print request to the IP address acquired in step S119, for example, using the wireless LAN such as Wi-Fi. The print request includes the print data generated in step S116. With this configuration, printing of the print data is performed by the apparatus 20 that has received the print request, and then a print result is returned to the vendor development program 110 from the apparatus 20.

On the other hand, if the print processing unit 122 of the print library 120 determines that the terminal device 10 cannot communicate with the apparatus 20 in step S118, the print processing unit 122 of the print library 120 transmits an error message to the vendor development program 110 using the print request unit 124. With this configuration, for example, an error message screen indicating that the printing cannot be performed is displayed on the display 12.

As to the printing system 1 of the first embodiment, various information managed by the print library 120 is provided by the manufacture manufacturing the apparatus 20, and the operation such as the reading and rewriting of various information by the vendor development program 110 developed by the third vendor can be restricted. In this description, the operation (e.g., reading, rewriting) of one type of specific information, managed by the print library 120, from the vendor development program 110 developed by the third vendor is restricted or prohibited while the operation (e.g., reading, rewriting) of another type of specific information, managed by the print library 120, from the vendor development program 110 developed by the third vendor is allowed. With this configuration, as to the printing system 1 of the first embodiment, a situation that various information managed by the print library 120 is rewritten with the unauthorized manner by the vendor development program 110 or a situation that various information managed by the print library 120 is unnecessary referred by the vendor development program 110 can be prevented.

Further, as to the printing system 1 of the first embodiment, by restricting the rewriting of information by the vendor development program 110, unintended actions of the apparatus 20 can be prevented.

For example, if the apparatus information corresponding to the field name of "support PDL" is rewritten by the vendor development program 110, the print data described with a data format not supported by the apparatus 20 may be generated in step S116 of FIG. 14. In this case, an unintentional error (e.g., data format error of print data) of the apparatus 20 may occur.

Further, for example, if the apparatus information corresponding to the field name of "IP address" is rewritten by the vendor development program 110, the print request may be transmitted to the apparatus 20 that is not intended by the print request in step S120 of FIG. 14. In this case, the printing may be performed at the unintended apparatus 20.

The first embodiment describes a case that printing is performed by the apparatus 20, but not limited thereto. For example, the first embodiment can be applied to a case that image data such as scanned image generated by a scanning operation of the apparatus 20 is acquired by the vendor development program 110. In this case, the print library 120 defines a class (e.g., scan image acquisition class) for acquiring the scanned image from the apparatus 20. Then, a scan image acquisition unit implemented by the scan image acquiring class can acquire the scanned image from the apparatus 20 based on the apparatus information.

Second Embodiment

Hereinafter, a description is given of a second embodiment with reference to the drawings. The first embodiment describes a case that the apparatus 20 is an MFP. The second embodiment describes another case that the apparatus 20 is a projector.

In the second embodiment, the difference between the first embodiment and the second embodiment is mainly described, and the description of the components similar to those of the first embodiment is omitted or simplified as appropriate.

Figure 16:
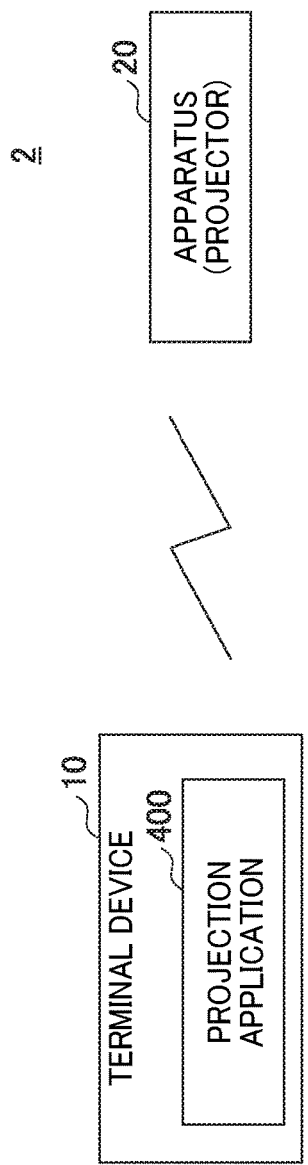
FIG. 16 illustrates an example of a schematic configuration of a projection system according to a second embodiment.

Schematic Configuration:

Hereinafter, a description is given of a schematic configuration of the projection system 2 according to the second embodiment with reference to FIG. 16. FIG. 16 illustrates an example of a schematic configuration of the projection system 2 according to the second embodiment.

As illustrated in FIG. 16, the projection system 2 includes, for example one or more terminal devices 10, and one or more apparatuses 20. The terminal device 10 and the apparatus 20 can be communicably connected with each other, for example, using a short-range wireless communication such as Bluetooth (registered trademark). Further, the terminal device 10 and the apparatus 20 can be communicably connected with each other, for example, via a wireless local area network (LAN) such as Wi-Fi (registered trademark).

The apparatus 20 is a projection apparatus such as a projector. The apparatus 20 performs projection processing in response to a request from the terminal device 10. The apparatus 20 may employ, for example, a hardware configuration of a general projector.

The terminal device 10 is, for example, an information processing device such as a smart phone. The terminal device 10 is installed with a projection application 400, developed by a third vendor, to perform processing associated or linked with the apparatus 20. A user of the terminal device 10 can project images using the apparatus 20 by using the projection application 400. A hardware configuration of the terminal device 10 is the same as that of the first embodiment.

Similar to the first embodiment, the terminal device 10 is not limited to the smartphone, but can be, for example, a tablet terminal, a notebook personal computer (PC), a desktop PC, a game device, a digital camera, a wearable device, or the like.

Figure 17:
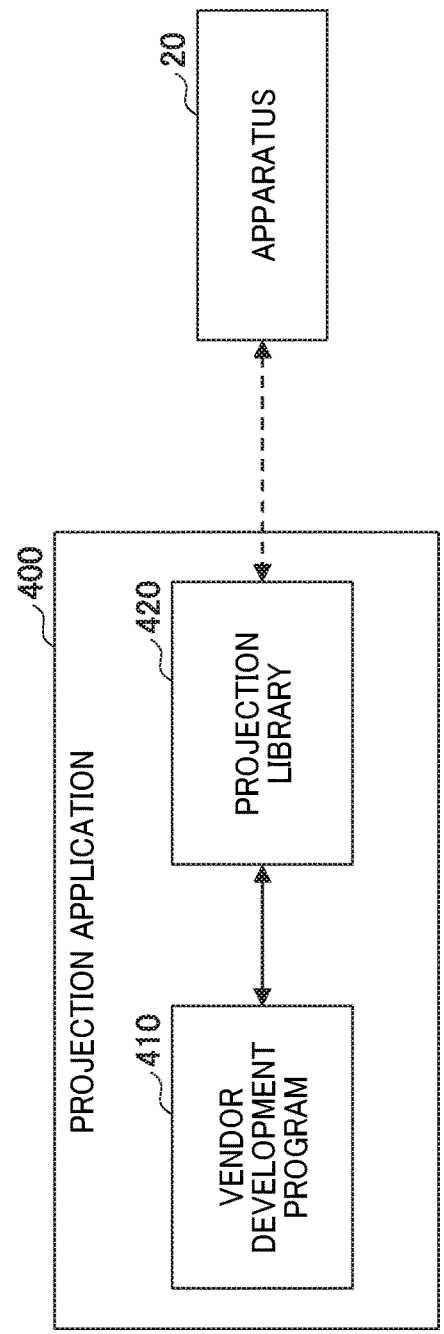
FIG. 17 illustrates an example of a configuration of a projection application according to the second embodiment.

Projection Application:

Hereinafter, a description is given of a configuration of a projection application 400 developed by the third vendor with reference to FIG. 17. FIG. 17 illustrates an example of a configuration of the projection application 400.

As illustrated in FIG. 17, the projection application 400, developed by the third vendor, includes, for example, a vendor development program 410, and a projection library 420. The vendor development program 410, developed by the third vendor, provides vendor-specific or unique functionality. The projection library 420 is an application programming interface (API) group provided by a manufacturer of the apparatus 20.

The projection library 420 is a program for providing a projection function. The projection library 420 defines, for example, an API for acquiring the apparatus information from the apparatus 20, and an API for requesting projection of image to the apparatus 20. Therefore, by calling the API defined in the projection library 420, the vendor development program 410 can perform processing in cooperation with the apparatus 20, such as acquiring the apparatus information from the apparatus 20, and transmitting a projection request to the apparatus 20.

Further, similar to the first embodiment, it is assumed that the vendor development program 410 and the projection library 420 are programs developed using Java (registered trademark) language.

Functional Configuration:

Hereinafter, a description is given of a functional configuration of the terminal device 10 according to the second embodiment with reference to FIG. 18. FIG. 18 illustrates an example of a functional block diagram of the terminal device 10 according to the second embodiment.

As illustrated in FIG. 18, the terminal device 10 includes, for example, an apparatus information acquisition request unit 411, a display control unit 412, a projection target data setting unit 413, a projection setting unit 414, an execution operation receiving unit 415, and a projection execution request unit 416. These functional units are implemented by executing the vendor development program 410 using the CPU 16.

The terminal device 10 further includes, for example, an apparatus information acquisition unit 421, and a projection processing unit 422. These functional units are implemented by processing performed by the CPU 16 using the projection library 420.

The apparatus information acquisition request unit 411 receives an acquisition operation of the apparatus information instructed by a user. When the apparatus information acquisition request unit 411 receives the acquisition operation of the apparatus information instructed by the user, the apparatus information acquisition request unit 411 requests the apparatus information acquisition unit 421 to acquire the apparatus information. The apparatus information acquisition request unit 411 can request the acquisition of the apparatus information by calling a method defined in a class (hereinafter, referred to as "apparatus information acquisition class 2300") that implements the apparatus information acquisition unit 421.

The display control unit 412 displays the apparatus information acquired by the apparatus information acquisition unit 421 on the display 12.

The projection target data setting unit 413 receives a selection operation of projection target data instructed by the user. The projection target data is content data that the user desires for projection. The content data includes, for example, image data such as still image, and video data. Hereinafter, it is assumed that the content data is image data.

When the projection target data setting unit 413 receives the selection operation of the projection target data instructed by the user, the projection target data setting unit 413 sets the selected content data as the projection target data.

Then, the projection setting unit 414 receives a designation operation of projection setting information instructed by the user. The projection setting information includes, for example, a switching method. The switching method indicates a display mode for switching a projection target image from one image to another image.

When the projection setting unit 414 receives the designation operation of the projection setting information instructed by the user, the projection setting unit 414 generates projection setting information instance 600 (FIG. 20) for retaining the projection setting information. Then, the projection setting unit 414 sets the projection setting information designated by the user in the projection setting information instance 600. The projection setting unit 414 can set the projection setting information by calling a method defined in a class (hereinafter, referred to as "projection setting information class 2200") that implements the projection setting information instance 600.

Then, the execution operation receiving unit 415 receives a projection execution operation performed by the user. When the execution operation receiving unit 415 receives the projection execution operation performed by the user, the projection execution request unit 416 requests the projection processing unit 422 to execute the projection. The projection execution request unit 416 can request the projection execution by calling a method defined in a class (hereinafter, referred to as "projection processing class 2400") that implements the projection processing unit 422.

In response to the request from the apparatus information acquisition request unit 411, the apparatus information acquisition unit 421 acquires the apparatus information from the apparatus 20. At this timing, the apparatus information acquisition unit 421 acquires the apparatus information from the apparatus 20 using, for example, a short-range wireless communication, such as Bluetooth (registered trademark). The apparatus information includes, for example, an IP address, a model name, a resolution, and a network information associated with the apparatus 20.

When the apparatus information is acquired from the apparatus 20, the apparatus information acquisition unit 421 generates an apparatus information instance 500 (FIG. 19) for retaining the acquired apparatus information. Then, the apparatus information acquisition unit 421 sets the acquired apparatus information in the apparatus information instance 500. The apparatus information acquisition unit 421 can set the apparatus information by calling a method defined in a class (hereinafter referred to as "apparatus information class 2100") that implements the apparatus information instance 500.

In response to the request from the projection execution request unit 416, the projection processing unit 422 generates projection data and then transmits a projection request to the apparatus 20. At this timing, the projection processing unit 422 transmits the projection request to the apparatus 20 using, for example, a wireless LAN, such as Wi-Fi (registered trademark).

As illustrated in FIG. 18, the projection processing unit 422 includes a projection data generation unit 423, and a projection request unit 424. The projection data generation unit 423 generates projection data. The projection data is generated by converting the projection target data into data described with a data format that can be projected by the apparatus 20 (e.g., a data format of resolution that can be processed by the apparatus 20). The projection request unit 424 transmits the projection request including the projection data, generated by the projection data generation unit 423, to the apparatus 20.

Hereinafter, a description is given of the apparatus information instance 500 with reference to FIG. 19. FIG. 19 illustrates an example of the apparatus information instance 500.

As illustrated in FIG. 19, the apparatus information instance 500 retains, for example, apparatus information corresponding to a field name of "IP address," apparatus information corresponding to a field name of "model name," apparatus information corresponding to a field name of "resolution," apparatus information corresponding to a field name of "network information." Since the apparatus information corresponding to the field names of "IP address," "model name," and "network information" are the same as that of the first embodiment, the description thereof will be omitted.

As to the apparatus information corresponding to the field name of "resolution," a resolution of image data that can be projected by the apparatus 20 is set as a field value. Further, the reading range and the rewriting range of the apparatus information corresponding to the field name of "resolution" are set "within library." This indicates that the apparatus information corresponding to the field name of "resolution" cannot be read and rewritten from a program (e.g., vendor development program 410) different from the projection library 420. However, the reading range of the apparatus information corresponding to the field name of "resolution" can be set "whole range" in some case.

Further, the field value set for the field name of "resolution" is not limited to a specific value of a specific resolution such as "1280×720." For example, a standard or classification of resolution, such as "Extended Graphics Array (XGA)" and "High Definition (HD) video" can be set as the field value of the field name of "resolution."

As to the above described apparatus information instance 500, the reading range and the rewriting range of the apparatus information retained by the apparatus information instance 500 are set. With this configuration, the manufacturer of the apparatus 20 can prevent the vendor development program 410, developed by the third vendor, from referring to the apparatus information (e.g., specific information in the apparatus information) unnecessary, and rewriting the apparatus information (e.g., specific information in the apparatus information) with the unauthorized manner. Further, the apparatus information retained by the apparatus information instance 500 is not limited to the above described "IP address," "model name," "resolution," and "network information." For example, the apparatus information instance 500 may retain various apparatus information, such as an apparatus serial number, an apparatus manufactured date, and information of manufacturer. The apparatus serial number can be used as the identification information identifying the apparatus 20.

Hereinafter, a description is given of the projection setting information instance 600 with reference to FIG. 20. FIG. 20 illustrates an example of the projection setting information instance 600.

As illustrated in FIG. 20, the projection setting information instance 600 retains projection setting information corresponding to a field name of "switching method."

As to the projection setting information corresponding to the field name of "switching method," a switching method designated by a user or a default switching method is set as the field value. As described above, the switching method indicates the display mode for switching the projection target image from one image to another image. The field values set for the field name of "switching method" include, for example, "none," "fade," and "cut." The "none" indicates one display mode that switches the projection target image from one image to another image by, for example, simply changing from the one image to another image. The "fade" indicates another display mode that switches the projection target image from one image to another image by, for example, fading out the one image and fading in another image. The "cut" indicates another display mode that switches the projection target image from one image to another image by, for example, cutting out the one image and cutting in another image.

The reading range and the rewriting range of the projection setting information corresponding to the field name of "switching method" are set "whole range." This indicates that the projection setting information corresponding to the field name of "switching method" can be read and rewritten from a program (e.g., vendor development program 410) different from the projection library 420.

As to the above described projection setting information instance 600, the reading range and the rewriting range of the projection setting information retained by the projection setting information instance 600 are set. With this configuration, the manufacturer of the apparatus 20 can prevent a situation that the vendor development program 410, developed by the third vendor, refers to the projection setting information (e.g., specific information in the projection setting information) unnecessary, and a situation that the vendor development program 410 rewrites the projection setting information setting only the default value. Further, the projection setting information retained by the projection setting information instance 600 is not limited to the above described "switching method."

In the above described configuration, the reading range and the rewriting range of the apparatus information instance 500 and the projection setting information instance 600 can be implemented by using a package of Java (registered trademark) language. For example, as illustrated in FIG. 21, a third package to which each class defined in the vendor development program 410 belongs, and a fourth package to which each class defined in the projection library 420 belongs are prepared as different packages.

By defining an access level for a method for operating the concerned field value (i.e., apparatus information) retained by the apparatus information instance 500, the reading range and the rewriting range of the concerned field value can be restricted. Similarly, by defining an access level for a method for operating the concerned field value (i.e., projection setting information) retained by the projection setting information instance 600, the reading range and the rewriting range of the concerned field value can be restricted. Hereinafter, a name of a package to which each class defined in the projection library 420 belongs is referred to as the package name of "projectionlibrary."

In an example case illustrated in FIG. 21, each class defined in the vendor development program 410 belongs to the same package (i.e., third package), but not limited thereto. For example, each class can belong to different packages.

Hereinafter, a description is given of an apparatus information class 2100 for implementing the apparatus information instance 500 with reference to FIG. 22. FIG. 22 illustrates an example of the apparatus information class 2100. Specifically, the apparatus information instance 500 is generated by instantiating the apparatus information class 2100 illustrated in FIG. 22.

As illustrated in FIG. 22, the apparatus information class 2100 includes a package declaration 2101, and a class declaration 2102. The package declaration 2101 defines the package name of "projectionlibrary." The class declaration 2102 includes methods declarations 2103 to 2110 for each apparatus information.

Since the method declarations 2103 to 2106 and the method declarations 2109 to 2110 are similar to the method declarations 1103 to 1106 and the method declarations 1109 to 1110 of the apparatus information class 1100 illustrated in FIG. 9, the description thereof is omitted.

The method declaration 2107 defines a method of "getResolution" for reading the apparatus information corresponding to the field name of "resolution." Further, in the method declaration 2107, no access modifier is defined for the method of "getResolution." With this configuration, the reading range of "within library" of the apparatus information corresponding to the field name of "resolution" is implemented.

The method declaration 2108 defines a method of "setResolution" for rewriting the apparatus information corresponding to the field name of "resolution." Further, in the method declaration 2108, no access modifier is defined for the method of "setResolution." With this configuration, the rewriting range of "within library" of the apparatus information corresponding to the field name of "resolution" is implemented.

As to the above described apparatus information class 2100, the access modifier of "public" is defined for one or more methods for operating (e.g., reading, rewriting) the apparatus information, with which the apparatus information can be operated from a class belonging to a different package. Further, as to the above described apparatus information class 2100, if the access modifier is not defined for one or more methods for operating (e.g., reading, rewriting) the apparatus information, the apparatus information cannot be operated from a class belonging to the different package.

Hereinafter, a description is given of a projection setting information class 2200 for implementing the projection setting information instance 600 with reference to FIG. 23. FIG. 23 illustrates an example of the projection setting information class 2200. Specifically, the projection setting information instance 600 is generated by instantiating the projection setting information class 2200 illustrated in FIG. 23.

As illustrated in FIG. 23, the projection setting information class 2200 includes a package declaration 2201, and a class declaration 2202. The package declaration 2201 defines the package name of "projectionlibrary." The class declaration 2202 includes method declarations 2203 and 2204 for each projection setting information.

The method declaration 2203 defines a method of "getSwitch" for reading the projection setting information corresponding to the field name of "switching method." Further, the method declaration 2203 defines the access modifier of "public" for the method of "getSwitch." With this configuration, the reading range of "whole range" of the projection setting information corresponding to the field name of "switching method" is implemented.

The method declaration 2204 defines a method of "setSwitch" for rewriting the projection setting information corresponding to the field name of "switching method." Further, the method declaration 2204 defines the access modifier of "public" for the method of "setSwitch." With this configuration, the rewriting range of "whole range" of the projection setting information corresponding to the field name of "switching method" is implemented.

As to the above described projection setting information class 2200, the access modifier of "public" is defined for one or more methods for operating (e.g., reading, rewriting) the projection setting information, with which the projection setting information can be operated from a class belonging to a different package. Further, as to the above described projection setting information class 2200, if the access modifier is not defined for one or more methods for operating (e.g., reading, rewriting) the projection setting information, the projection setting information cannot be operated from a class belonging to the different package.

Hereinafter, a description is given of an apparatus information acquisition class 2300 for implementing the apparatus information acquisition unit 421 with reference to FIG. 24. FIG. 24 illustrates an example of the apparatus information acquisition class 2300. Specifically, the apparatus information acquisition unit 421 is generated by instantiating the apparatus information acquisition class 2300 illustrated in FIG. 24.

As illustrated in FIG. 24, the apparatus information acquisition class 2300 includes a package declaration 2301, and a class declaration 2302. The package declaration 2301 defines the package name of "projectionlibrary." The class declaration 2302 includes a method declaration 2303.

The method declaration 2303 defines a method of "getProjectorInfo" for acquiring the apparatus information from the apparatus 20. Further, the method declaration 2303 defines the access modifier of "public" for the method of "getProjectorInfo." With this configuration, the method of "getProjectorInfo" can be also called from a class belonging to a package different from the package of the projection library 420 (i.e., a class defined in a program different from the projection library 420).

Hereinafter, a description is given of a projection processing class 2400 for implementing the projection processing unit 422 with reference to FIG. 25. FIG. 25 illustrates an example of the projection processing class 2400. Specifically, the projection processing unit 422 is generated by instantiating the projection processing class 2400 illustrated in FIG. 25.

As illustrated in FIG. 25, the projection processing class 2400 includes a package declaration 2401, and a class declaration 2402. The package declaration 2401 defines the package name of "projectionlibrary." The class declaration 2402 includes a method declaration 2403.

The method declaration 2403 defines a method of "project" for transmitting a projection request to the apparatus 20. Further, the method declaration 2403 defines the access modifier of "public" for the method of "project." With this configuration, the method of "project" can be also called from a class belonging to a package different from the package of the projection library 420 (i.e., a class defined in a program different from the projection library 420).

Further, the method declaration 2403 defines "ProjectorInfo info," "Projectdata" and "ProjectSetting setting" as the arguments of the method of "project." This indicates that the apparatus information, the projection target data, and the projection setting information are designated as the arguments of the method of "project."

Hereinafter, a description is given of a program code 2500 of the vendor development program 410 with reference to FIG. 26. FIG. 26 illustrates an example of the program code 2500 of the vendor development program 410. FIG. 26, illustrates an example of the program code 2500 that defines each code, respectively corresponding to the apparatus information acquisition request unit 411, the projection target data setting unit 413, the projection setting unit 414, and the projection execution request unit 416. Further, the codes, respectively corresponding to the display control unit 412 and the execution operation receiving unit 415, are required to be defined separately.

As illustrated in FIG. 26, the program code 2500 includes, for example, a package declaration 2501, and a class declaration 2502. The package declaration 2501 defines the package name of "projectionapp." Therefore, the vendor development program 410 cannot call one or more methods not defined with the access modifier of "public," among the method defined in each of the classes belonging to the package name of "projectionlibrary."

The class declaration 2502 includes a projection execution class 2503. The projection execution class 2503 includes, for example, a code definition 2504 defined with a code corresponding to the apparatus information acquisition request unit 411, and a code definition 2505 defined with a code corresponding to the projection setting unit 414. The projection execution class 2503 further includes, for example, a code definition 2506 defined with a code corresponding to the projection target data setting unit 413, and a code definition 2507 defined with a code corresponding to the projection execution request unit 416.

As indicated in the code definition 2507, the vendor development program 410 designates an "info" indicating the apparatus information instance 500 when calling the method of "project" of the projection processing class 2400 belonging to the package name of "projectionlibrary." With this configuration, in a case of processing the method of "project," a method not defined with the access modifier of "public" in the apparatus information instance 500 can be called, and then a processing request (e.g., projection request) can be transmitted to the apparatus 20. For example, in a case of processing the method of "project," by calling the method of "getResolution" corresponding to "info" indicating the apparatus information instance 500 and acquiring the apparatus information corresponding to the field name of "resolution," the projection request designating the acquired apparatus information can be transmitted to the apparatus 20.

Therefore, the projection application 400 can transmit the processing request (e.g., registration request) to the apparatus 20 using information that the vendor development program 410 cannot operate (e.g., apparatus information corresponding to the field name of "resolution" and apparatus information corresponding to the field name of "network information").

Figure 27:
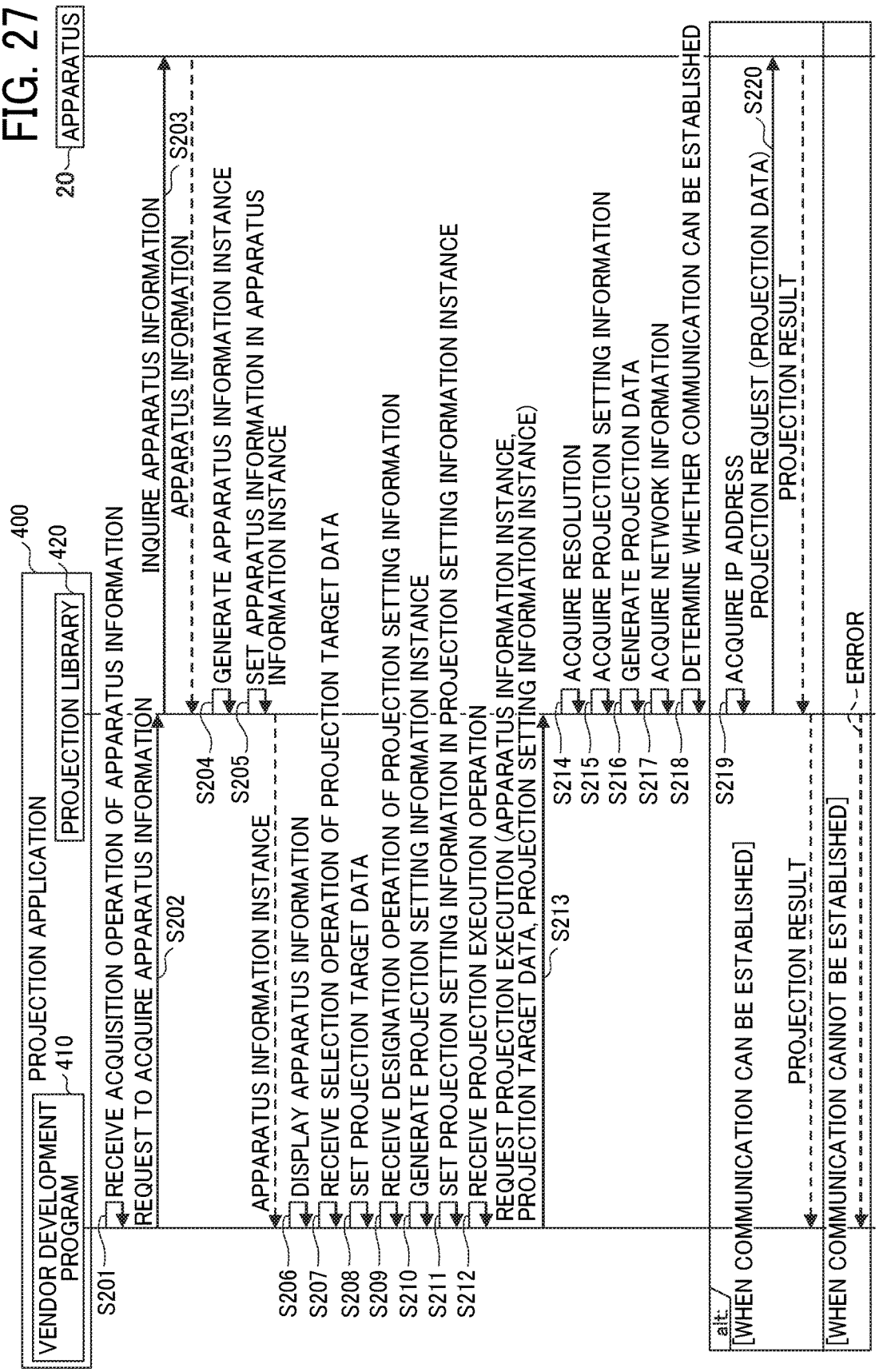
FIG. 27 is an example of a sequence diagram of a projection processing according to the second embodiment.

Projection Processing:

Hereinafter, a description is given of the projection processing of the projection system 2 according to the second embodiment. Hereinafter, a description is given of a process when a user of the terminal device 10 uses the projection application 400 to project an image using the apparatus 20 with reference to FIG. 27. FIG. 27 illustrates an example of a sequence diagram of the projection processing according to the second embodiment.

Hereinafter, it is assumed in FIG. 27 that each of the classes defined in the vendor development program 410 and the projection library 420 is already instantiated except the apparatus information class 2100 and the projection setting information class 2200. Further, some of the classes defined in the vendor development program 410 and the projection library 420 may not be yet instantiated in some case. In this case, the not-instantiated class is instantiated as needed before executing the processing of a functional unit (instance) implemented by the corresponding class. Further, the apparatus information class 2100 and the projection setting information class 2200 can be also instantiated in advance in some case.

At first, similar to step S101 in FIG. 14, the apparatus information acquisition request unit 411 of the vendor development program 410 receives the acquisition operation of the apparatus information instructed by the user (step S201).

When the apparatus information acquisition request unit 411 of the vendor development program 410 receives the acquisition operation of the apparatus information instructed by the user, the apparatus information acquisition request unit 411 requests the apparatus information acquisition unit 421 to acquire the apparatus information (step S202). Specifically, the apparatus information acquisition request unit 411 can generate the request for acquiring the apparatus information by calling the method of "getProjectorInfo" defined in the method declaration 2303 of the apparatus information acquisition class 2300.

Similar to step S103 in FIG. 14, when the apparatus information acquisition unit 421 of the projection library 420 receives the request for acquiring the apparatus information, the apparatus information acquisition unit 421 transmits an inquiry of the apparatus information to the apparatus 20 (step S203). Then, the apparatus information acquisition unit 421 receives the apparatus information returned from the apparatus 20 in response to the above inquiry. With this configuration, the apparatus information acquisition unit 421 can acquire the apparatus information, such as IP address, model name, resolution, and network information from the apparatus 20.

When the apparatus information acquisition unit 421 of the projection library 420 acquires the apparatus information from the apparatus 20, the apparatus information acquisition unit 421 generates the apparatus information instance 500 (step S204). Specifically, the apparatus information instance 500 is generated by instantiating the apparatus information class 2100.

Then, the apparatus information acquisition unit 421 of the projection library 420 sets the apparatus information acquired from the apparatus 20 in the apparatus information instance 500 (step S205).

That is, the apparatus information acquisition unit 421 designates the IP address acquired from the apparatus 20 as the argument to call the method of "setIPAddress" defined in the method declaration 2104 of the apparatus information class 2100. With this configuration, the apparatus information corresponding to the field name of "IP address" is set in the apparatus information instance 500.

Similarly, the apparatus information acquisition unit 421 designates the model name acquired from the apparatus 20 as the argument to call the method of "setModelName" defined in the method declaration 2106 of the apparatus information class 2100. With this configuration, the apparatus information corresponding to the field name of "model name" is set in the apparatus information instance 500.

Similarly, the apparatus information acquisition unit 421 designates the resolution acquired from the apparatus 20 as the argument to call the method of "setResolution" defined in the method declaration 2108 of the apparatus information class 2100. With this configuration, the apparatus information corresponding to the field name of "resolution" is set in the apparatus information instance 500.

Similarly, the apparatus information acquisition unit 421 designates the network information acquired from the apparatus 20 as the argument to call the method of "setNetworkInfo" defined in the method declaration 2110 of the apparatus information class 2100. With this configuration, the apparatus information corresponding to the field name of "network information" is set in the apparatus information instance 500.

Then, the apparatus information acquisition unit 421 returns the apparatus information instance 500, set with each apparatus information acquired from the apparatus 20, to the vendor development program 410.

The display control unit 412 of the vendor development program 410 acquires the apparatus information from the apparatus information instance 500 returned from the apparatus information acquisition unit 421.

Then, the display control unit 412 displays the apparatus information acquired from the apparatus information instance 500 on the display 12 (step S206). In step S206, the display control unit 412 can acquire the apparatus information corresponding to the field name including the reading range of "whole range" from the apparatus information retained in the apparatus information instance 200 as similar to step S106 in FIG. 14. With this configuration, for example, a situation of displaying the apparatus information (e.g., resolution, network information), which is not necessarily referred by the user, can be prevented.

Then, the projection target data setting unit 413 of the vendor development program 410 receives a selection operation of projection target data instructed by the user (step S207). For example, the user can change one screen displaying the apparatus information to another screen displaying a list of content data in step S206, and then select desired content data from the list of content data to perform the selection operation of the projection target data in step S207.

When the projection target data setting unit 413 of the vendor development program 410 receives the selection operation of the projection target data instructed by the user, the projection target data setting unit 413 sets the selected content data as the projection target data (step S208). If the projection target data is already set in advance before performing step S201, steps S207 and S208 can be omitted.

Then, the projection setting unit 414 of the vendor development program 410 receives a designation operation of the projection setting information instructed by the user (step S209). For example, the user can designate a set value of each of the projection setting information on a given screen, displayed after selecting the projection target data, to perform the designation operation of the projection setting information. If the user has no intension to change the projection setting information (i.e., if the default value is used as the set value of the projection setting information), step S209 can be omitted.

Then, the projection setting unit 414 of the vendor development program 410 generates the projection setting information instance 600 (step S210). Specifically, the projection setting information instance 600 is generated by instantiating the projection setting information class 2200.

Then, the projection setting unit 414 of the vendor development program 410 sets the projection setting information, designated by the user in step S209, in the projection setting information instance 600 (step S211).

That is, the projection setting unit 414 designates the switching method designated by the user as the argument to call the method of "setSwitch" defined in the method declaration 2204 of the projection setting information class 2200. With this configuration, the projection setting information corresponding to the field name of "switching method" is set in the projection setting information instance 600.

Then, the execution operation receiving unit 415 of the vendor development program 410 receives a projection execution operation performed by the user (step S212). Specifically, the user can perform the projection execution operation by pressing a projection execution button on a given screen displayed after designating the projection setting information.

When the execution operation receiving unit 415 receives the projection execution operation performed by the user, the projection execution request unit 416 of the vendor development program 410 requests the projection processing unit 422 to execute the projection (step S213). The projection execution request includes the apparatus information instance 500, the projection target data, and the projection setting information instance 600. The projection execution request unit 416 can request the projection execution by designating the apparatus information instance 500, the projection target data, and the projection setting information instance 600 as the arguments, and then calling the method of "project" defined in the method declaration 2403 of the projection processing class 2400.

For example, if the number of the apparatus information instance 500 is plural (i.e., if a plurality of apparatuses 20 exists in the surroundings, and the apparatus information is acquired from the plurality of apparatuses 20, respectively), by designating the apparatus information instance 500 as the argument for the method of "project," which apparatus information instance 500 is to be used can be designated. Therefore, a plurality of pieces of information that cannot be operated from the vendor development program 410 can be managed.

For example, if the number of the apparatus information instance 500 is plural, the apparatus information corresponding to the field name of "resolution" exists for each one of the apparatuses 20. In this case, the apparatus information corresponding to the field name of "resolution" cannot be referred from the vendor development program 410. Although the vendor development program 410 cannot directly designate one specific apparatus information from the plurality of the apparatus information, the vendor development program 410 can indirectly designate the resolution of the to-be-used apparatus 20 by designating the apparatus information instance 500.

The projection processing unit 422 of the projection library 420 acquires the resolution from the apparatus information instance 500 included in the projection execution request using the projection data generation unit 423 (step S214). That is, the projection data generation unit 423 acquires the apparatus information corresponding to the field name of "resolution" from the apparatus information retained in the apparatus information instance 500. By calling the method of "getResolution" defined in the method declaration 2107 of the apparatus information class 2100, the projection data generation unit 423 can acquire the apparatus information corresponding to the field name of "resolution." Since the projection processing class 2400 that implements the projection processing unit 422 and the apparatus information class 2100 belong to the same package of "projectionlibrary," the projection data generation unit 423 can call the method of "getResolution."

Then, the projection processing unit 422 of the projection library 420 acquires the projection setting information from the projection setting information instance 600 included in the projection execution request using the projection data generation unit 423 (step S215). That is, the projection data generation unit 423 acquires the projection setting information retained in the projection setting information instance 600. The projection data generation unit 423 can acquire the projection setting information corresponding to the field name of "switching method" by calling the method of "getSwitch" defined in the method declaration 2203 of the projection setting information class 2200.

Then, the projection processing unit 422 of the projection library 420 instructs the projection data generation unit 423 to generate projection data (step S216). That is, the projection data generation unit 423 generates the projection data from the projection target data using the resolution acquired in step S214. In step S216, for example, the projection data generation unit 423 generates the projection data by converting the resolution of the projection target data into the resolution acquired in step S214.

Then, similar to step S117 in FIG. 14, the projection processing unit 422 of the projection library 420 acquires the network information from the apparatus information instance 500 included in the projection execution request using the projection request unit 424 (step S217).

Then, similar to step S118 of FIG. 14, the projection processing unit 422 of the projection library 420 determines whether communication with the apparatus 20 can be established based on the network information acquired in step S217 using the projection request unit 424 (step S218).

If the projection processing unit 422 of the projection library 420 determines that the terminal device 10 can communicate with the apparatus 20 in step S218, the projection processing unit 422 of the projection library 420 acquires the IP address from the apparatus information instance 500 included in the projection execution request using the projection request unit 424 (step S219) as similar to step S119 in FIG. 14.

Then, the projection processing unit 422 of the projection library 420 transmits a projection request to the apparatus 20 using the projection request unit 424 (step 220). That is, the projection request unit 424 transmits the projection request to the IP address acquired in step S219, for example, using the wireless LAN, such as Wi-Fi. The projection request includes the projection data generated in step S216. With this configuration, projection of the image matched to the projection data is performed by the apparatus 20 that has received the projection request, and then a projection result is returned to the vendor development program 410 from the apparatus 20.

On the other hand, if the projection processing unit 422 of the projection library 420 determines that the terminal device 10 cannot communicate with the apparatus 20 in step S218, the projection processing unit 422 of the projection library 420 transmits an error message to the vendor development program 410 using the projection request unit 424. With this configuration, for example, an error message screen indicating that the projection cannot be performed is displayed on the display 12.

As to the projection system 2 according of the second embodiment, various information managed by the projection library 420 is provided by the manufacture manufacturing the apparatus 20 (i.e., projector), and the reading and rewriting of various information of the projection library 420 by the vendor development program 410 developed by the third vendor can be restricted. In this description, the operation (e.g., reading, rewriting) of one type of specific information, managed by the projection library 420, from the vendor development program 410 developed by the third vendor is restricted or prohibited while the operation (e.g., reading, rewriting) of another type of specific information, managed by the projection library 420, from the vendor development program 410 developed by the third vendor is allowed. With this configuration, as to the projection system 2 of the second embodiment, a situation that various information managed by the projection library 420 is rewritten with the unauthorized manner by the vendor development program 410 or a situation that various information managed by the projection library 420 is unnecessary referred by the vendor development program 410 can be prevented.

Further, as to the projection system 2 of the second embodiment, by restricting the rewriting of information by the vendor development program 410, unintended actions of the apparatus 20 can be prevented.

Third Embodiment

Hereinafter, a description is given of a third embodiment with reference to drawings. In the above described first embodiment and the second embodiment, the application described with the executable format (e.g., print application 100, projection application 400) is installed on the terminal device 10, in which the application (e.g., print application 100, projection application 400) is created by compiling a source file defined with a program code. The third embodiment describes a case that a development terminal 30, such as a personal computer (PC), compiles the source file to create the application (e.g., print application 100, projection application 400) described with the executable format, such as Java byte code. Hereinafter, the print application 100 or the projection application 400 is referred to as an application 700 in the third embodiment.

In the third embodiment, the difference with respect to the first embodiment and the second embodiment is mainly described, and the description of the components similar to those of the first embodiment and the second embodiment is omitted or simplified as appropriate.

Figure 28:
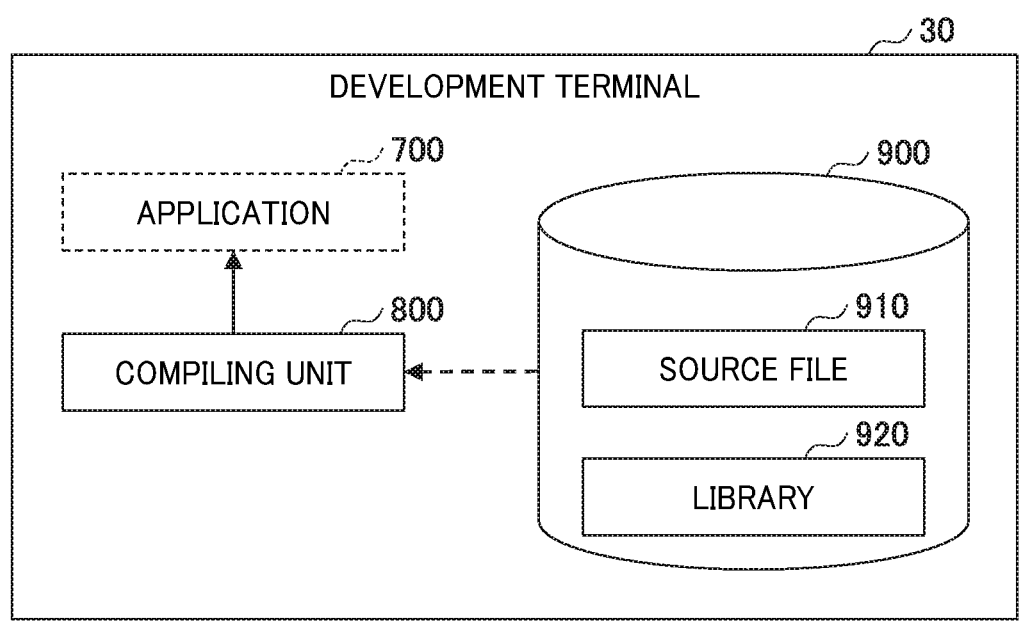
FIG. 28 illustrates an example of a functional block diagram of a development terminal according to a third embodiment.

Functional Configuration:

Hereinafter, a description is given of a functional configuration of a development terminal 30 of the third embodiment with reference to FIG. 28. FIG. 28 illustrates an example of a functional block diagram of the development terminal 30 according to the third embodiment. The development terminal 30 may employ a hardware configuration similar to the hardware configuration of the terminal device 10.

As illustrated in FIG. 28, the development terminal 30 includes, for example, a compiling unit 800. The compiling unit 800 is implemented by executing one or more programs installed in the development terminal 30 using a CPU of the development terminal 30.

The development terminal 30 further includes a storage unit 900. The storage unit 900 can be implemented, for example, by using an auxiliary storage device such as an HDD or SSD. Further, the storage unit 900 may be implemented using a storage device or the like connected to the development terminal 30 via a network.

As illustrated in FIG. 28, the storage unit 900 stores a source file 910, and a library 920. When the application 700 is to be created as the print application 100, the source file 910 is a file described with a source code of the vendor development program 110, and when the application 700 is to be created as the projection application 400, the source file 910 is a file described with a source code of the vendor development program 410. Further, when the application 700 is to be created as the print application 100, the library 920 is the print library 120, and when the application 700 is to be created as the projection application 400, the library 920 is the projection library 420.

For example, the library 920 is distributed from a manufacturer of the apparatus 20 together with a manual describing a method (e.g., a method for designating an argument) of using an API (method) defined in the library 920.

By inputting the source file 910 and the library 920 to the compiling unit 800, the compiling unit 800 compiles the source file 910 (more specifically, compiles the source file 910 and the library 920) to create the application 700 described with the executable format. At this timing, the compiling unit 800 determines whether an access relationship is defined correctly between a class defined a target method to be called (hereinafter, to-be-called target method) and a class to be used as a source for calling the to-be-called target method.

That is, the compiling unit 800 determines whether the class defined for the to-be-called target method and the class to be used as the source for calling the to-be-called target method belong to the same package. Further, if the compiling unit 800 determines that the concerned two classes do not belong to the same package, the compiling unit 800 determines whether the access modifier of "public" is defined for the to-be-called target method.

If the compiling unit 800 determines that the access relationship is correctly defined for all of the to-be-called target methods defined in the source file 910, the compiling unit 800 compiles the source file 910 to create the application 700 described with the executable format. On the other hand, if the compiling unit 800 determines that the access relationship is not correctly defined for at least one to-be-called target method, the compiling unit 800 displays an error message screen or the like.

Compiling Process:

Hereinafter, a description is given of a compiling process of the development terminal 30 of the third embodiment. Hereinafter, a description is given of a process when a user (e.g., an application developer such as a third vendor) of the development terminal 30 compiles the source file 910 to create the application 700 described with the executable format with reference to FIG. 29.

Figure 29:
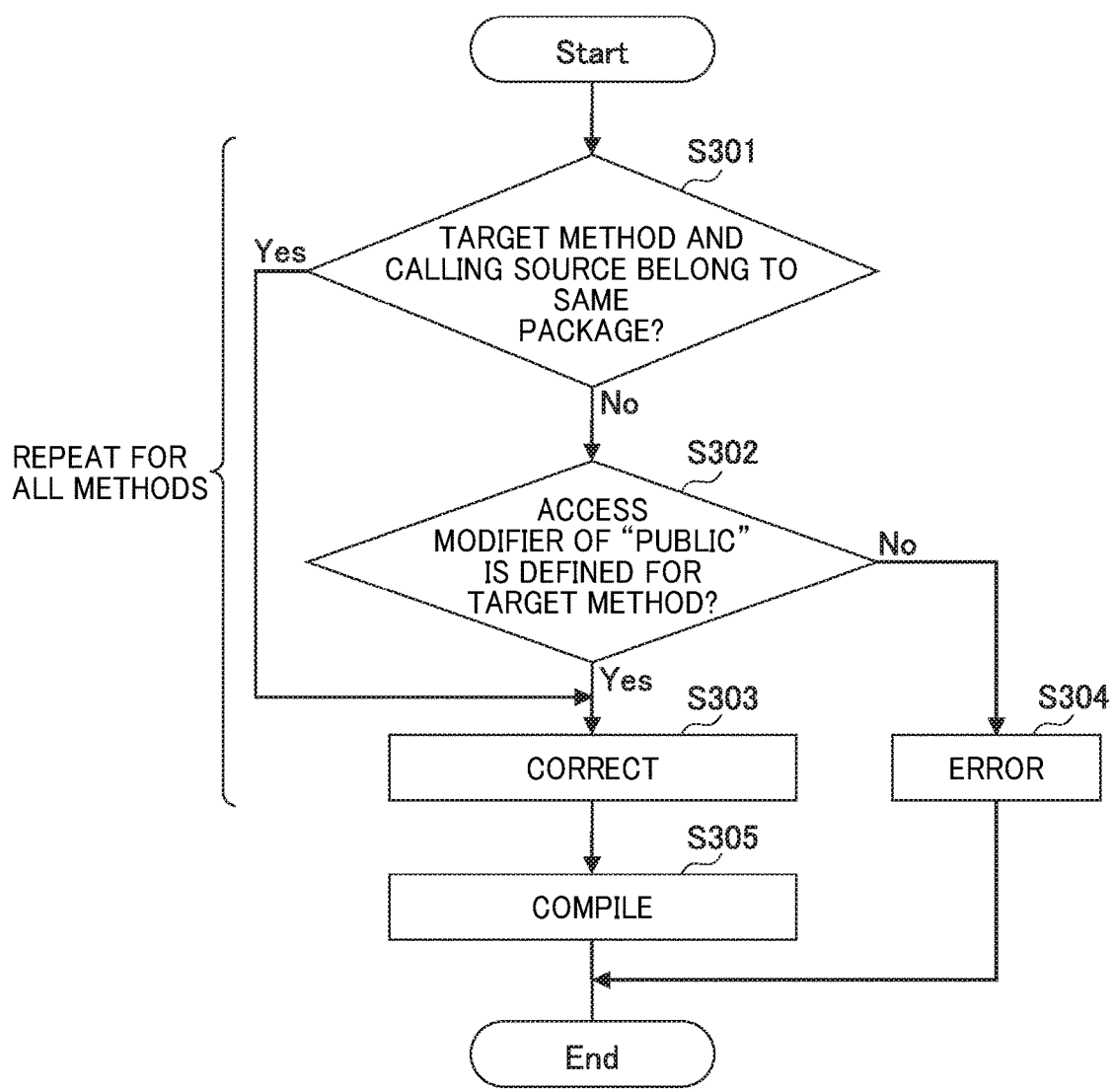
FIG. 29 is an example of a flowchart illustrating the steps of a compilation process according to the third embodiment.

FIG. 29 is an example of a flowchart illustrating of the steps of a compiling process according to the third embodiment. The sequence illustrated in FIG. 29 starts, for example, by inputting the source file 910 and the library 920 into the compiling unit 800 in accordance with an operation performed by the user of the development terminal 30 (i.e., compilation start operation of the source file 910), and the sequence is repeatedly performed for each code indicating the calling process of the to-be-called target method defined in the source file 910.

At first, the compiling unit 800 determines whether a class of a to-be-called target method defined in the code and a class of the source for calling the to-be-called target method belong to the same package (step S301).

If the compiling unit 800 determines that the class of the to-be-called target method and the class of the source for calling the to-be-called target method do not belong to the same package (S301: NO), the compiling unit 800 determines whether the access modifier of "public" is defined for the to-be-called target method (step S302).

If the compiling unit 800 that the class of the to-be-called target method and the class to-be-called of the class of the source for calling the target method belong to the same package (S301: YES), or if the compiling unit 800 determines that the access modifier of "public" is defined for the to-be-called target method (S302: YES), the compiling unit 800 determines that the access relationship is defined correctly for the to-be-called target method (step S303).

On the other hand, if the compiling unit 800 determines that the access modifier of "public" is not defined for the to-be-called target method (S302: NO), the compiling unit 800 determines that the access relationship is not defined correctly for the to-be-called target method, and determines an error (step S304). In step S304, the compiling unit 800 displays the error message screen indicating that the access relation is not defined correctly for the to-be-called target method defined in the source file 910, and then ends the sequence of the compiling process.

On the other hand, if the compiling unit 800 determines that the access relationship is defined correctly for all of the to-be-called target methods defined in the source file 910 (step S303), the compiling unit 800 compiles the source file 910 and the library 920 to create the application 700 described with the executable format (step S305). With this configuration, the application 700 (e.g., print application 100, projection application 400) that restricts the operation performable by the vendor development program 110 or the vendor development program 410 is created for various information managed by the library 920 such as the print library 120 or the projection library 420. More specifically, the application 700 is created by linking object files, created by compiling the source file 910 and the library 920.

As to the above described embodiments, unauthorized rewriting of information acquired from an apparatus can be prevented.

Numerous additional modifications and variations are possible in light of the above teachings. It is therefore to be understood that, within the scope of the appended claims, the disclosure of this patent specification may be practiced otherwise than as specifically described herein.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing device configured to communicate with an apparatus, the information processing device comprising:
   memory configured to store a first package and a second package therein,
   the first package including a first class, and
   the second package including a second class, the second class including routines with declarations indicating whether the routines therein are callable by the first class within the first package; and
   circuitry configured to,
   transmit a first request to the apparatus connected with the information processing device, the first request requesting information associated with the apparatus,
   acquire the information associated with the apparatus from the apparatus as a response to the first request,
   control, via the second package, access to the information associated with the apparatus such that the first package is selectively restricted from accessing the information associated with the apparatus, and
   transmit a second request to the apparatus based on the information associated with the apparatus, the second request requesting the apparatus to perform specific processing, wherein the apparatus performs the specific processing in response to the second request.

2. The information processing device of claim 1, wherein the circuitry is further configured to
   determine whether the first package may update the information associated with the apparatus, which is contained within the second class, based on whether the routines in the second class associated with the information are restricted from the first package.

3. The information processing device of claim 2, wherein the circuitry is further configured to restrict the first package from updating the information associated with the apparatus, by the first package.

4. The information processing device of claim 1, wherein the circuitry is further configured to
   prevent the first package from accessing the information associated with the apparatus, based on whether the routines in the second class associated with the information associated with the apparatus are restricted from the first package.

5. The information processing device of claim 4,
   wherein the circuitry is further configured to set the information associated with the apparatus by using the routines associated with the second class within the second package which are restricted from the first package, and
   restricts the first package from accessing the information associated with the apparatus.

6. The information processing device of claim 1, wherein the information processing device is further configured to communicate with more than one apparatus, and the circuitry is configured to
   acquires a plurality of information associated with identification information of each one of the apparatuses, stores the plurality of information associated with the identification information of each one of the apparatuses in the memory, identify a specific apparatus from the plurality of the apparatuses based on the information included in the second request, request the specific apparatus to perform a function in accordance with the second request initiated by the first package, and restrict the first package from accessing or modifying the information.

7. The information processing device of claim 1, wherein the apparatus is an image processing apparatus configured to perform at least printing, and the circuitry is further configured to request the image processing apparatus to perform the at least printing in accordance with the second request based on the information associated with the apparatus, and restrict the first package from accessing or modifying the information.

8. The information processing device of claim 1, wherein the information associated with the apparatus acquired by the circuitry from the apparatus includes connection information including at least an internet protocol (IP) address and network information of the apparatus, the connection information retrievable via ones of the routines with declarations indicating that the ones of routines are callable by the first package, the connection information writable via ones of the routines with declarations indicating that the ones of the routines are callable by the first package.

9. The information processing device of claim 1, wherein the first package is developed by a vendor different from a manufacturer of the apparatus.

10. The information processing device of claim 1, wherein the circuitry is further configured to execute the second package in order to implement one or more functions of the information processing device.

11. The information processing device of claim 10, wherein the circuitry is further configured to prevent the first package from accessing or modifying the information associated with the apparatus initiated by the first package, and allow the second package to access or modify the information initiated by the first package.

12. An information processing system comprising:

an image processing apparatus configured to perform image processing; and an information processing device configured to communicate with the image processing apparatus, the information processing device including memory configured to store a first package and a second package therein, the first package including a first class and the second package including a second class, the second class including routines with declarations indicating whether the routines therein are callable by the first class within the first package, and circuitry configured to transmit a first request to the image processing apparatus connected with the information processing device, the first request requesting information associated with the image processing apparatus, acquire the information associated with the image forming apparatus from the image processing apparatus as a response to the first request, control, via the second package, access to the information associated with the image processing apparatus such that the first package is selectively restricted from accessing the information associated with the image forming apparatus, and transmit a second request to the image processing apparatus based on the information associated with the image processing apparatus, the second request requesting the image processing apparatus to perform specific processing, wherein the image forming apparatus performs the specific processing.

13. A method of processing information by an information processing device, the information processing device including memory configured to store a first package and a second package therein, the first package including a first class and the second package including a second class, the second class including routines with declarations indicating whether the routines therein are callable by the first class within the first package, the information processing device configured to communicate with an apparatus, the method comprising:

transmitting a first request to the apparatus connected with the information processing device, the first request requesting information associated with the apparatus;

acquiring the information associated with the apparatus from the apparatus as a response to the first request;

controlling, via the second package, access to the information associated with the device such that the first package is selectively restricted from accessing the information associated with the apparatus; and transmitting a second request to the apparatus based on the information associated with the apparatus, the second request requesting the apparatus to perform specific processing, wherein the apparatus performs the specific processing.

14. The information processing system of claim 12, wherein the circuitry is further configured to prevent the first package from accessing the information associated with the image processing apparatus based on whether the routines in the second class associated with the information associated with the information processing apparatus are restricted from the first package.

15. The information processing system of claim 14, wherein the circuitry is further configured to set the information associated with the image processing apparatus by using the routines associated with the second class within the second package which are restricted from the first package, and restrict the first package from accessing the information associated with the image processing apparatus.

16. The information processing system of claim 12, wherein the information processing device is further configured to communicate with more than one image processing apparatus, and the circuitry is further configured to acquire a plurality of information associated with identification information of each one of image processing apparatuses, store the plurality of information associated with the identification information of each one of the image processing apparatuses in the memory, identify a specific image processing apparatus from the plurality of the image processing apparatuses based on the information included in the second request, request the specific image processing apparatus to perform a function in accordance with the second request initiated by the first package, and restrict the first package from accessing or modifying the information.

\* \* \* \* \*